(12) United States Patent
Werlinger

(10) Patent No.: US 8,408,377 B2
(45) Date of Patent: Apr. 2, 2013

(54) RELOAD CONVEYOR WITH ARTICULATING CONVEYOR FRAME

(75) Inventor: Jay Werlinger, Brownsburg, IN (US)

(73) Assignee: Earth Corp. Industries, LLC, Pittsboro, IN (US)

( * ) Notice: Subject to any disclaimer, the term of this patent is extended or adjusted under 35 U.S.C. 154(b) by 121 days.

(21) Appl. No.: 12/921,350

(22) PCT Filed: Mar. 5, 2009

(86) PCT No.: PCT/US2009/036167
§ 371 (c)(1),
(2), (4) Date: Sep. 7, 2010

(87) PCT Pub. No.: WO2009/111628
PCT Pub. Date: Sep. 11, 2009

(65) Prior Publication Data
US 2011/0000761 A1 Jan. 6, 2011

Related U.S. Application Data

(60) Provisional application No. 61/068,205, filed on Mar. 5, 2008.

(51) Int. Cl.
*B65G 15/26* (2006.01)
(52) U.S. Cl. ........................... 198/313; 198/312
(58) Field of Classification Search .................. 198/312, 198/313, 581
See application file for complete search history.

(56) References Cited

U.S. PATENT DOCUMENTS

| | | | |
|---|---|---|---|
| 5,197,845 A | 3/1993 | Snead | |
| 6,129,196 A * | 10/2000 | Lapper et al. | 198/313 |
| 6,302,265 B1 * | 10/2001 | Cunningham | 198/313 |
| 6,447,238 B1 | 9/2002 | Brown | |
| 6,814,532 B1 | 11/2004 | Thompson et al. | |
| 6,964,551 B1 | 11/2005 | Friesen | |
| 7,267,519 B2 * | 9/2007 | Cresswell et al. | 198/313 |
| 7,273,150 B2 * | 9/2007 | Fridman et al. | 198/313 |

OTHER PUBLICATIONS

International Searching Authority, International Search Report, PCT/US09/36167, dated May 12, 2009.
International Searching Authority (ISA), Written Opinion of ISA, PCT/US09/36167, dated May 12, 2009.

* cited by examiner

*Primary Examiner* — James R Bidwell
(74) *Attorney, Agent, or Firm* — Ice Miller LLP

(57) ABSTRACT

A reload conveyor is disclosed in the present disclosure. Such a reload conveyor includes a conveyor frame 14 and a material receiving mechanism 18. The conveyor frame 14 is configured to articulate to assume a transport configuration and a material transfer configuration wherein the overall length of the reload conveyor in the transport configuration can be substantially shorter than in the transfer configuration. The material receiving mechanism can be configured and arranged to assume a transfer configuration and a transport configuration wherein the width of the material receiving mechanism is substantially less in the transport configuration than in the transfer configuration.

17 Claims, 30 Drawing Sheets

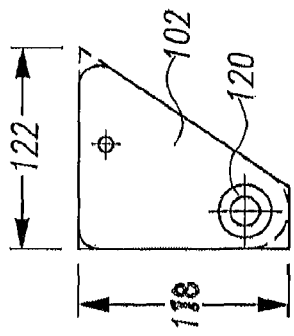
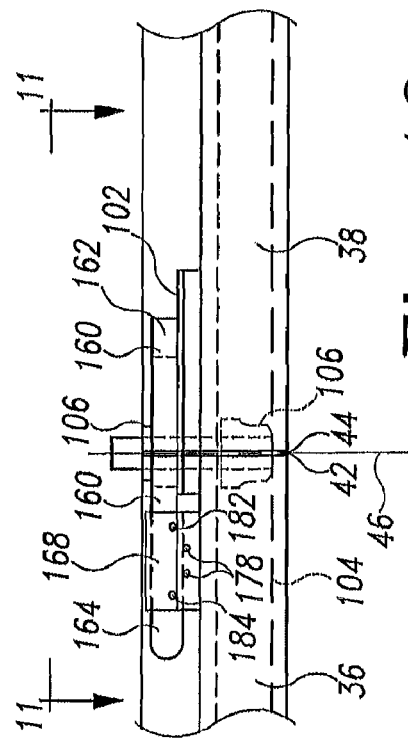
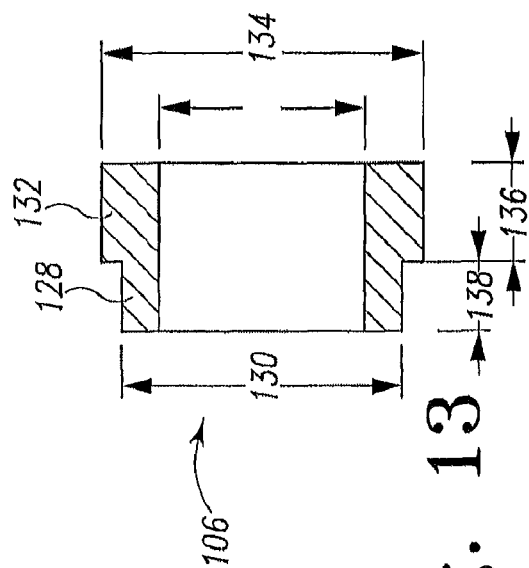
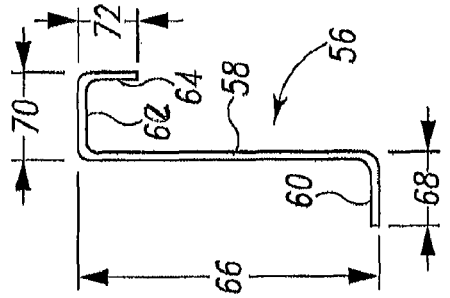
Fig. 12
Fig. 10
Fig. 13
Fig. 9

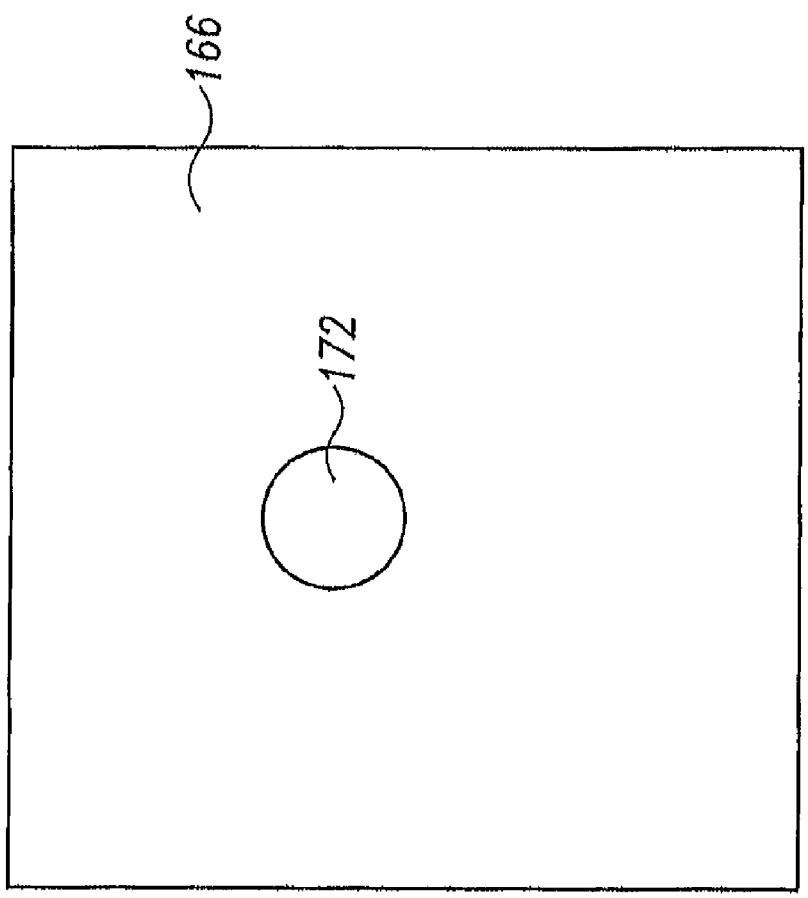

RELOAD CONVEYOR WITH ARTICULATING CONVEYOR FRAME

PRIORITY

The present application is related to, and claims the priority benefit of International Patent Application Serial No. PCT/US2009/036167, filed Mar. 5, 2009, which is related to, and claims the priority benefit of, U.S. Provisional Patent Application Ser. No. 61/068,205, filed Mar. 5, 2008. The contents of each of these applications are hereby incorporated by reference in their entirety into this disclosure.

BACKGROUND AND SUMMARY

This invention relates to a device and combination of devices for facilitating the spreading of materials and more particularly to a conveyor which is configurable between a transport configuration and a material transfer configuration wherein the conveyor is configured to receive materials from a transport vehicle and transfer those materials into a material receiver of a spreader device and a combination of the conveyor and spreader device.

Often landscaping companies and construction companies utilize a spreader or slinger truck to spread compost, grass seeds and other bulk materials over a large area. One such application is the utilization of compost or grass seeds along the side of a public thoroughfare following road construction. Such spreaders or slingers allow large quantities of material to be spread rapidly. Unfortunately spreaders and slingers typically have limited capacity for storing the material to be spread. In the road construction example, other trucks or trailers are often used to deliver the bulk material to be spread to the site at which it will be spread while the spreader or slinger remains at the current landscaping site.

Typically the delivery vehicle is not equipped to effectively transfer the material into the hopper or storage section of the spreader or slinger. For example, spreader/slingers such as the CAS ST™, CAS MGT™ and CAS AT6™ available from Conveyor Application Systems, LLC of Eugene Oreg., a wholly owned subsidiary of Rexius Corporation, include an open top bed acting as a hopper for holding materials to be spread by a spreader conveyor or hose. Similar spreaders or slingers are available from other manufactures, such as, for example, Express Blower, Inc. of Eugene, Oreg.

The open top of such spreaders/slingers is too high off of the ground for standard dump trucks of other standard delivery vehicles to transfer their load of material directly into the hopper section of the spreader or slinger. One system for transferring material from a delivery vehicle to the general purpose CAS ST™ and CAS MG™ slinger trucks or to other slingers and spreaders is a reload conveyor. One known reload conveyor is also manufactured by Conveyor Application Systems and is configured to reload the CAS slinger trucks and similar slingers and spreaders having a top opening bed or hopper. The CAS MG™, which is specifically designed for roadside applications, appears to have its own reload conveyor system attached thereto.

Known existing reload conveyors are typically high capacity conveyors designed to handle a wide range of materials that can be spread by the slinger trucks including, but not limited to compost, mulch, seeds, construction aggregates, asphalt, concrete, sand, top soil, cinder rock and crushed or rounded rock or stone. Such reload conveyors include a rigid straight conveyor bed or frame and a hopper for receipt of the material to be loaded into the slinger or spreader. A conveyor belt is guided by the conveyor bed or frame and transports material from the hopper to a discharge end of the reload conveyor. The rigid conveyor frame may be attached to a trailer providing wheels for transporting the reload conveyor to work sites. The rigid conveyor frame may be mounted in a manner to allow the rigid frame to be rotated about a pivot point adjacent the hopper so that the discharge end of the conveyor may be elevated for transferring material from the hopper into the open bead of the spreader and lowered for transportation of the reload conveyor. When in transport configuration, such reload conveyors are very long.

Often, in order to receive materials from a dump or conveyor bed truck, the hopper of a reload conveyor is sized to exceed the width of the bed of the truck so that during material transfer most of the material leaving the bed of the truck is discharged into the hopper when the truck is properly positioned. Often, trucks used to transport materials are manufactured with beds that approach the width limitation for travel on public thoroughfares without a wide load permit, signage or escort and/or chase vehicles. Thus, a hopper configured to be wider than the bed of such trucks may exceed the limitation for travel on public thoroughfares without a wide load permit, signage or escort and/or chase vehicles.

According to one aspect of the disclosure a reload conveyor with an articulating conveyor frame includes a conveyor frame and a material receiving mechanism. The conveyor frame is configured to articulate to assume a transport configuration and a material transfer configuration wherein the overall length of the reload conveyor in the transport configuration is substantially shorter than in the transfer configuration. The material receiving mechanism is also configured and arranged to assume a transfer configuration and a transport configuration wherein the width of the material receiving mechanism is substantially less in the transport configuration than in the transfer configuration.

According to another aspect of the disclosure a reload conveyor with an articulating conveyor frame comprises a conveyor frame and a material receiving mechanism. The conveyor frame is configured to articulate to assume a transport configuration and a material transfer configuration.

Additional features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The present invention is illustrated by way of example and not limitation in the figures of the accompanying drawings in which like references indicate similar elements and in which:

FIG. 9 is a sectional view taken along line 9-9-2 of FIG. 8 of the proximal rail of the conveyor frame;

FIG. 10 is a top view of the conveyor fold joint of the reload conveyor showing a fold joint mechanism including plates, pins, blocks and a mechanical lock and angle adjustment mechanism;

FIG. 12 is a plan view of a plate of the conveyor fold joint mechanism;

FIG. 13 is a sectional view of a bushing of the conveyor fold joint mechanism;

FIG. 14 is a plan view of the offset block of the conveyor fold joint mechanism;

DETAILED DESCRIPTION

Figure 1:
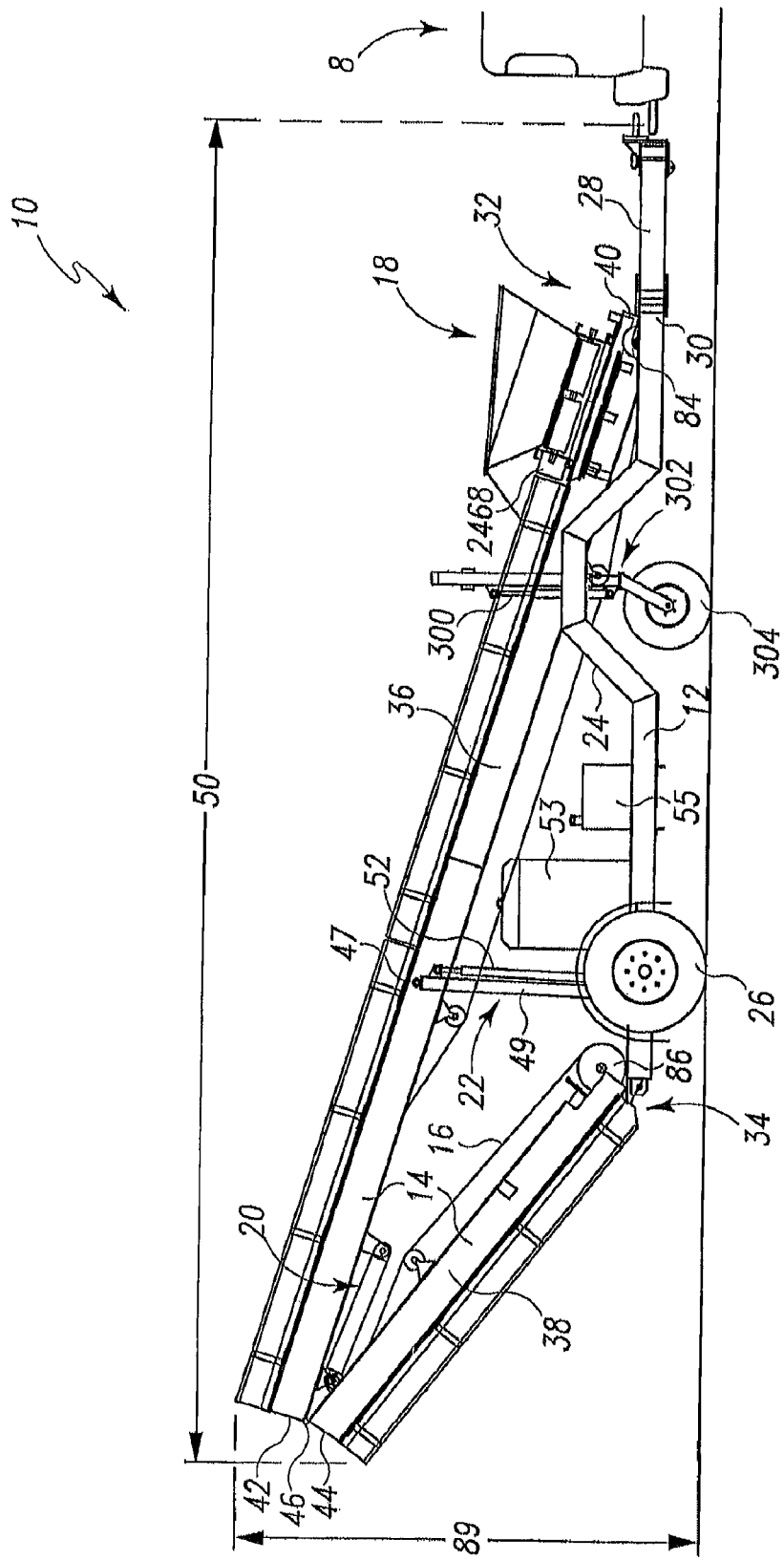
FIG. 1 is a side view of the reload conveyor with articulating conveyor frame in a transport configuration and coupled to a standard ball hitch of a transport vehicle.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present invention includes any alterations and modifications to the illustrated embodiments and includes further applications of the principles of the disclosure as would normally occur to one skilled in the art to which this invention pertains.

As shown, for example, in FIGS. 1-8, a reload conveyor 10 with articulating conveyor frame includes a trailer 12, a conveyor frame 14, a conveyor belt 16, a material-receiving device 18, frame articulation mechanisms 20, and frame pivoting mechanisms 22. The trailer 12 is configured to include a frame 24 having a plurality of wheels 26 and a tow hitch assembly 28. The tow hitch assembly 28 is configured for coupling the reload conveyor 10 to a transport vehicle 8 for transportation to and from a work site.

The conveyor frame 14 is coupled to the trailer 12 to pivot about a pivot axis 30 adjacent a load end 32 so that a discharge end 34 of the conveyor can be raised and lowered as the conveyor frame 14 pivots about the axis 30. The conveyor frame 14 includes a load end component 36 and a discharge end component 38. One end 40 of the load end component 36 is pivotally coupled to the trailer 12 to pivot about the pivot axis 30. The other end 42 of load end component 36 is pivotally coupled to the proximal end 44 of the discharge end component 38 so that the discharge end component 38 can pivot about pivot axis 46 relative to the load end component 36.

Figure 2:
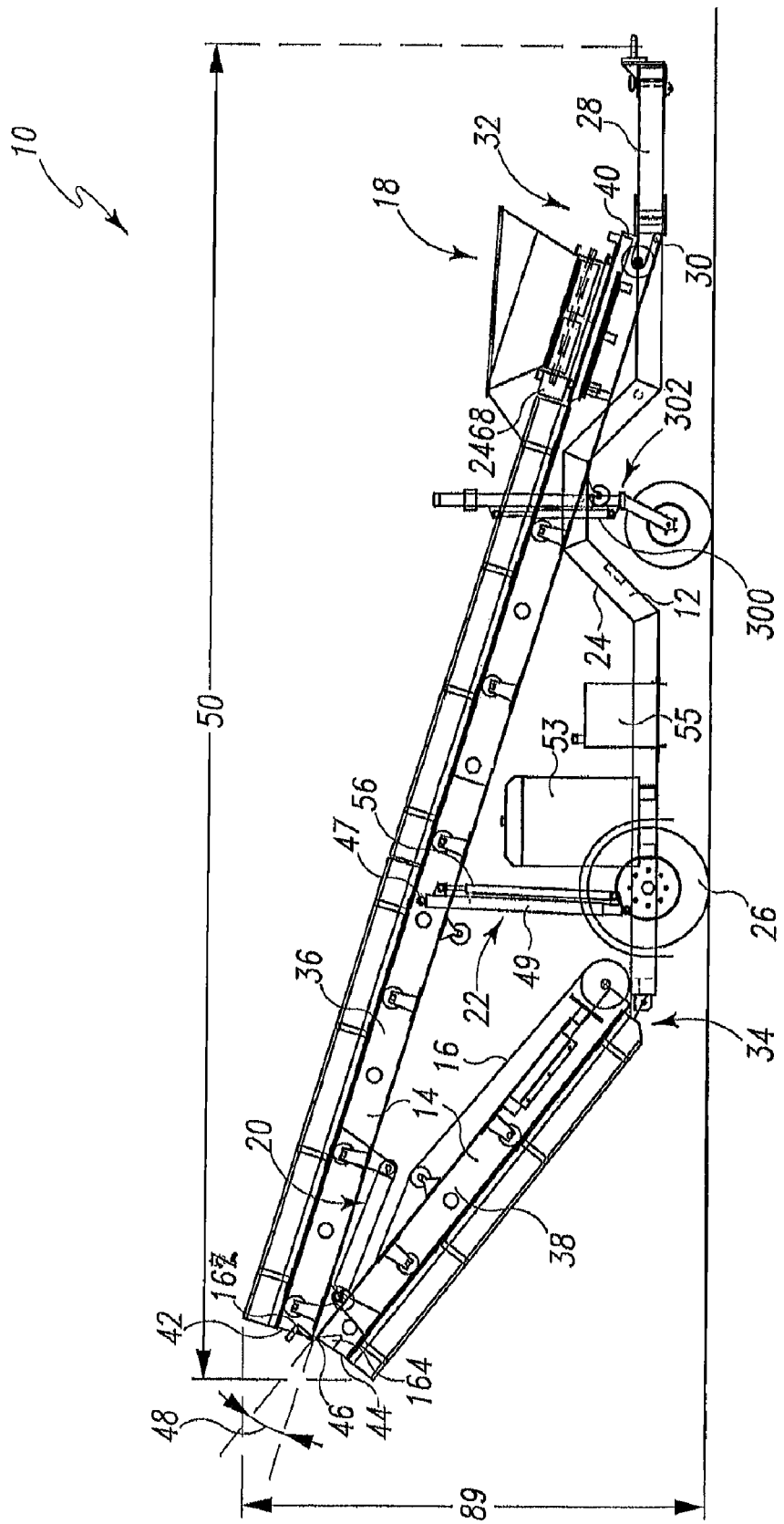
FIG. 2 is a side view of the reload conveyor with articulating conveyor frame in a transport configuration.
Figure 3:
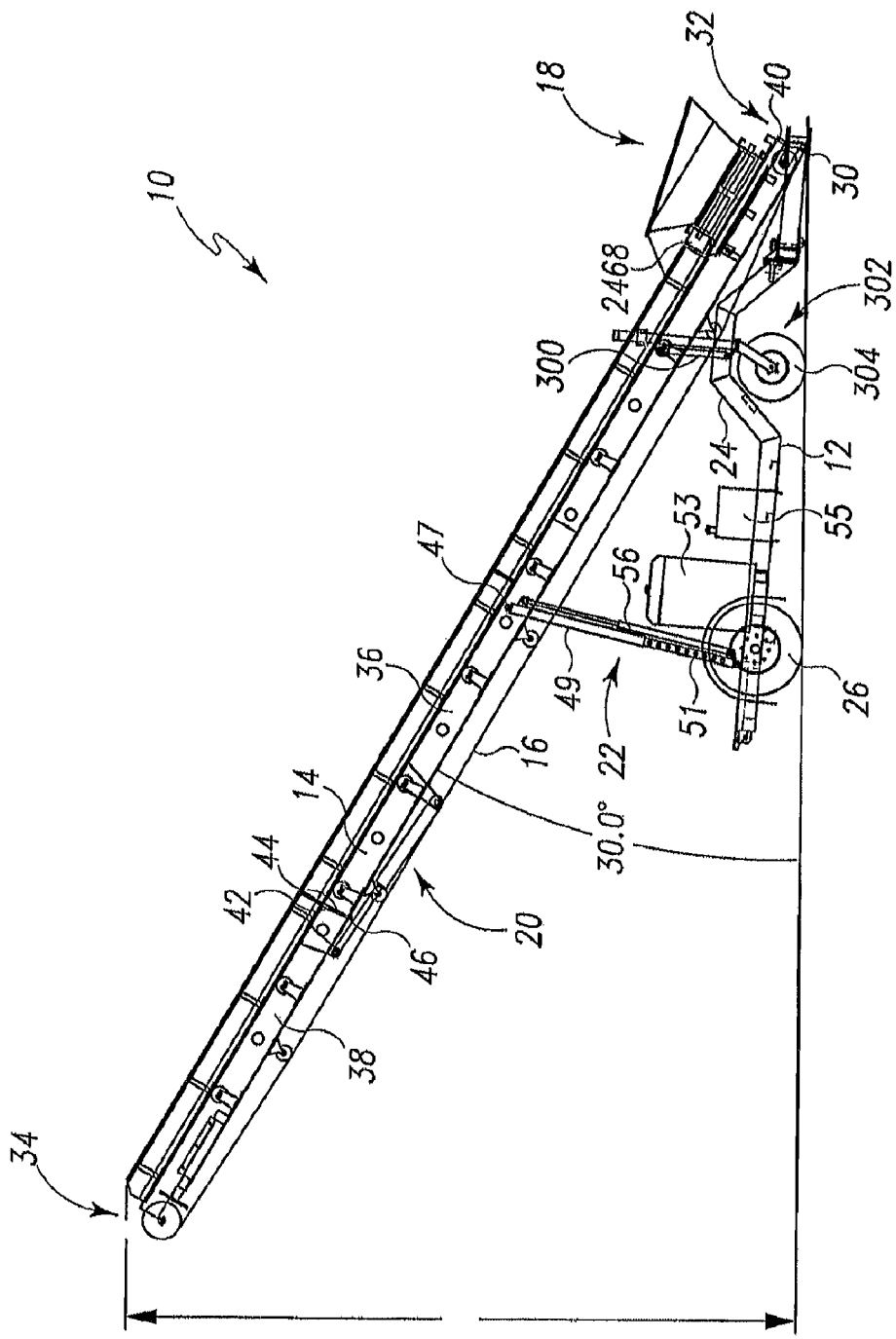
FIG. 3 is a side view of the reload conveyor in a thirty degree lift material transfer configuration.
Figure 4:
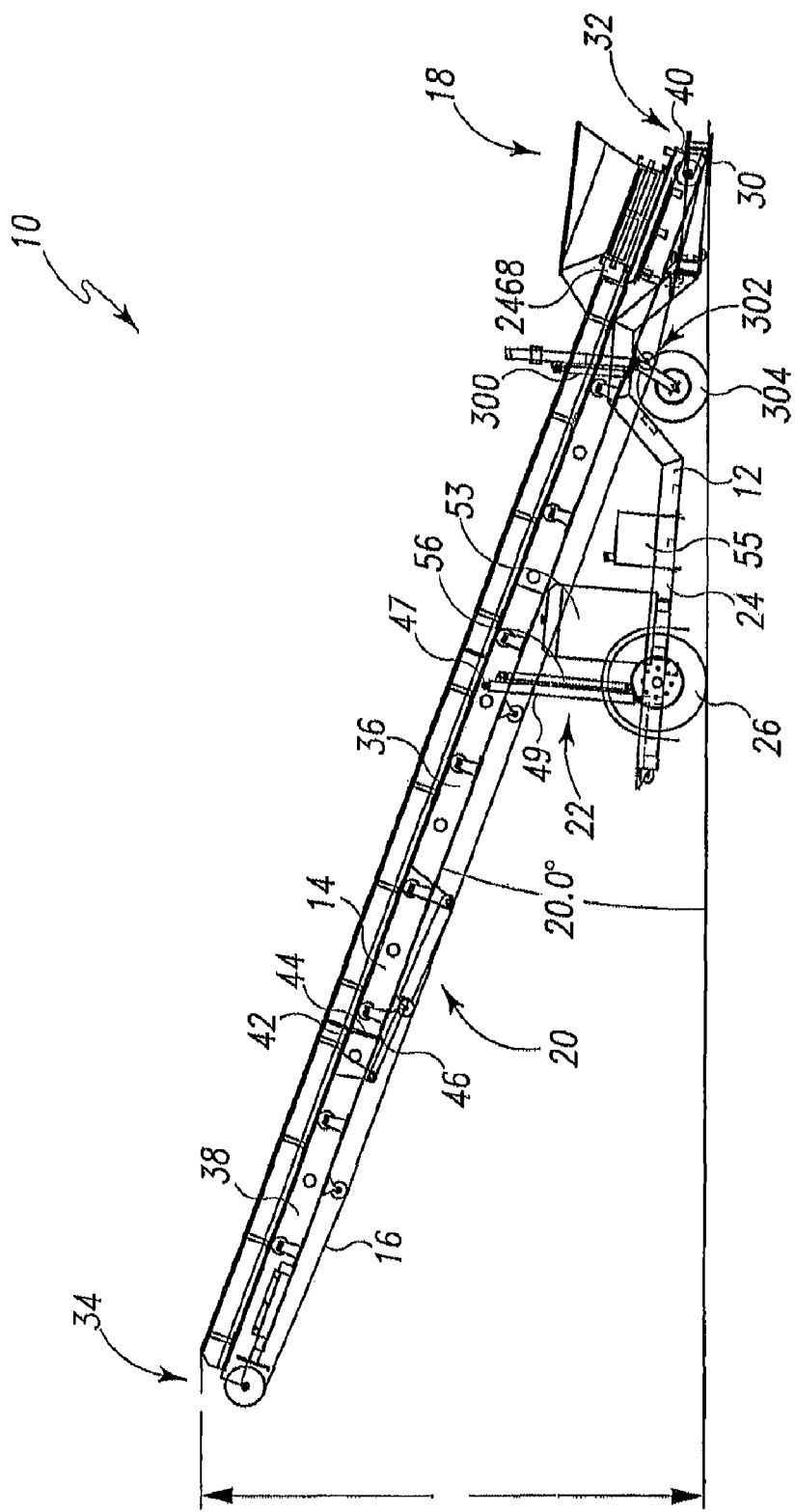
FIG. 4 is a side view of the reload conveyor in a twenty degree lift material transfer configuration.
Figure 8:
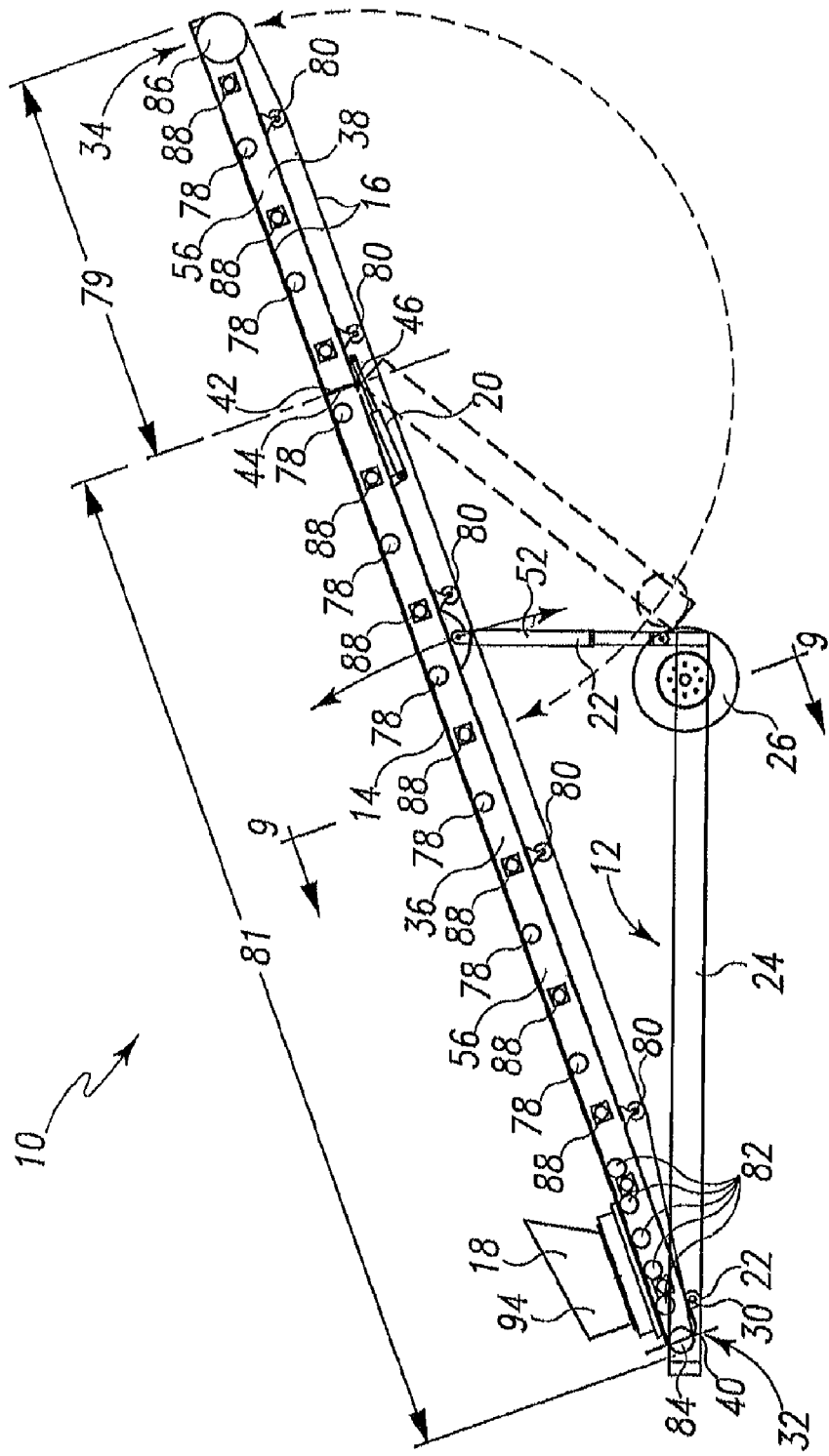
FIG. 8 is a side elevation view of the reload conveyor in a material transfer configuration (with portions of the hydraulic system, the bogie, the skirt board attachment and trailer hitch removed for clarity) showing the articulating conveyor frame locked in a position wherein the components are in alignment and pivoted about an axis adjacent the material receiving mechanism to position the discharge end of the conveyer at a height for discharging material into the bed of a spreader or slinger and showing the conveyor in a transport configuration in phantom lines.

The conveyor frame 14 is configured to assume a transport configuration, as shown, for example, in FIGS. 1-2 and in phantom lines in FIG. 8, and a transfer configuration, as shown, for example, in FIG. 3-8. In the transfer configuration, the discharge end component 38 and the load end component 36 are generally aligned to form a generally straight conveyor frame 14. While generally straight, it is within the scope of the disclosure for the discharge end component 38 to form an obtuse angle with the load end component, as will be described herebelow with reference to the frame joint pivot mechanism and lock shown in FIGS. 10-16. In the transport configuration, the discharge end component 38 forms a non-straight angle 48 with the load end component 36. In one configuration, the discharge end component 38 forms an acute angle with the load end component 36 when the conveyor frame 14 is in the transport configuration. In one specific embodiment, when the conveyor frame 14 is in the transport configuration, the angle formed between the discharge end component 38 and load end component 36 is approximately 150 degrees.

One advantage to having the discharge end component 38 form an acute angle 48 with the load end component 36 is that both the overall height and overall length of the conveyor 10 may be reduced when the conveyor frame is in the transport configuration. In the illustrated embodiment, the discharge end component 38 is substantially shorter than the load end component 36 and thus, the distal end 42 of the load end component 36 need not be raised to as great a height as would be required to form an acute angle between end components having similar lengths. By reducing the height to which the distal end 42 of the load end component 36 must be raised to allow the reload conveyor 10 to assume the transport position, the center of gravity of the reload conveyor 10 remains low reducing the likelihood that the reload conveyor 10 would tip during reconfiguration. This allows the reload conveyor 10 to be reconfigured on unlevel ground with less likelihood of tipping or overturning. When the reload conveyor 10 is in the transport configuration it exhibits an overall height 89. Preferably the overall height is less than thirteen feet six inches to avoid having to obtain special permits, signage or lead and/or chase vehicles when the conveyor 10 is being transported on public highways.

Preferably, the overall length 50 of the reload conveyor 10 in the transport configuration is less than or equal to the legal maximum length for an object to be towed without obtaining special permits or signage, or without providing lead and/or chase vehicles during transport. In one specific embodiment, the overall length 50 is less than or equal to forty feet.

The illustrated embodiment of the reload conveyor 10 includes a frame pivoting mechanism 22 comprising a pair of elevation cylinders 52 coupled to a pair of telescoping supports including a top member 49 in which a bottom member 51 is slidably received on opposite sides of the conveyor 10 and the pivotal mounting of the load end of the load end component 36 to the trailer frame. Each cylinder 52 extends between, and is pivotally coupled at opposite ends to, the trailer frame 24 and a pivot axis 47 extending through a bracket extending downwardly from one of the rails 56 forming the load end component 36 of the conveyor frame 14. In one embodiment this coupling is accomplished by attaching a first end of the cylinder to the top member 49 of the telescoping support and the second end of the cylinder to the bottom member 51 of the support. The tope end of the top member of the support is then pivotally coupled to the load end of the frame at pivot axis 47 and the bottom member of the support is pivotally coupled to the frame 24 of the trailer 12. These cylinders 52 when extended raise, and when retracted lower, the height of the pivot axis 47 and consequently the distal end 42 of the load end component 36, the proximal end 44 of the discharge end component 38 and the pivot axis 46 at which the end components 36, 38 are coupled. Illustratively, the pivot axis 47 is displaced from the pivot axis 30 by a displacement 45. In one embodiment, the displacement 45 is fifteen feet three inches.

Extension and retraction of the cylinders 52 induce the conveyor frame 14 to pivot about pivot axis 30. These cylinders 52 are extended and retracted to aid in transforming the conveyor frame 14 between the transport configuration and the transfer configuration. The cylinders 52 are also extended to raise the height of the discharge end of the conveyor 10 when the conveyor frame 14 is in the transfer configuration so that materials conveyed thereon can be discharged into the bed or hopper of the spreader/slinger. The bottom member 51 of the support is configured to include a plurality of stop pin holes 57 in which a stop pin 59 (see FIG. 6) is inserted to inhibit the frame 14 from pivoting about pivot axis 30 when the reload conveyor 10 is in the desired load configuration.

In one specific embodiment, the cylinders 52 are hydraulic cylinders and appropriate hydraulic circuitry 53 and hydraulic controls 55 are provided for operation of the hydraulic cylinders 52, as shown, for example, in FIGS. 1-4. It is within the scope of the disclosure for other actuators to be provided to raise and lower the height of the pivot axes 46, 47 to facilitate transformation of the reload conveyor between the transport and transfer configurations. By way of example and not limitation, other actuators that may be substituted for the cylinders 52 are pneumatic cylinders, electro-magnetic linear actuators, mechanical linear actuators such as jack mechanisms and non-linear actuators that will induce the load end component 36 to pivot about pivot axis 30.

Each of the load end component 36 and discharge end component 38 include a pair of parallel rail members separated laterally from one another by a displacement 54. As shown, for example, in FIG. 9, in one specific embodiment, each of the rails 56 includes an upright member 58, an inwardly extending flange 60, an outwardly extending flange 62 and a downwardly extending flange 64. The upright member 58 has a height 66, which in one specific embodiment is nine inches. The inwardly extending flange 60 extends perpendicularly inwardly from the bottom edge of the upright member 58 a distance 68, which in one specific embodiment is two and one quarter inches. The outwardly extending flange 62 extends perpendicularly outwardly from the top edge of the upright member 58 by a distance 70, which in one specific embodiment is two and one half inches. The downwardly extending flange 64 extends perpendicularly downwardly (i.e. parallel to the upright member) from the outward edge of the outwardly extending flange by a distance 72, which in one specific embodiment is one and a half inches. In one specific embodiment, each rail member is formed by bending quarter inch thick steel plate to generate a rail having the cross-sectional configuration shown in FIG. 9. While only one rail 56 is show in FIG. 9, it should be understood that the opposite side rail is a mirror image of that shown in FIG. 9, as the conveyor frame 14 is generally symmetrical about a plane 74 extending through the longitudinal axis 76.

Each rail 56 of the discharge end component 38, and thus the discharge end component 38 itself, has a length 79, which in one embodiment is eight feet. Each rail 56 of the load end component 36, and thus the load end component 36 itself, has a length 81 which in one embodiment is twenty feet. It is within the scope of the disclosure for the lengths 79, 81 of the end components to be increased and/or decreased. In fact, the embodiment illustrated in FIGS. 1-8 includes a load end component having a length 81 of approximately twenty-two feet.

Figure 21:
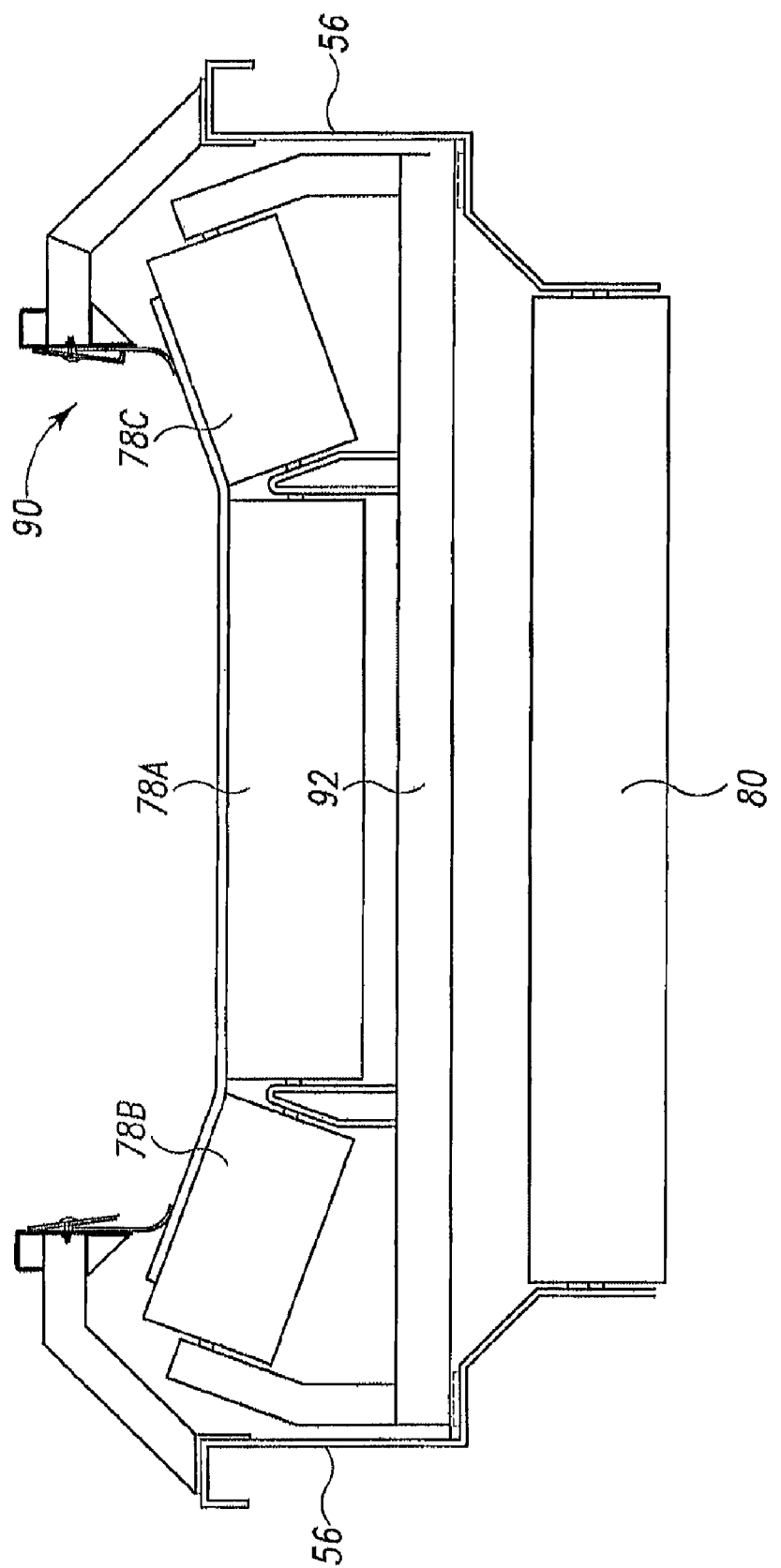
FIG. 21 is a sectional view of the conveyor frame showing the skirt board assembly.
Figure 22:
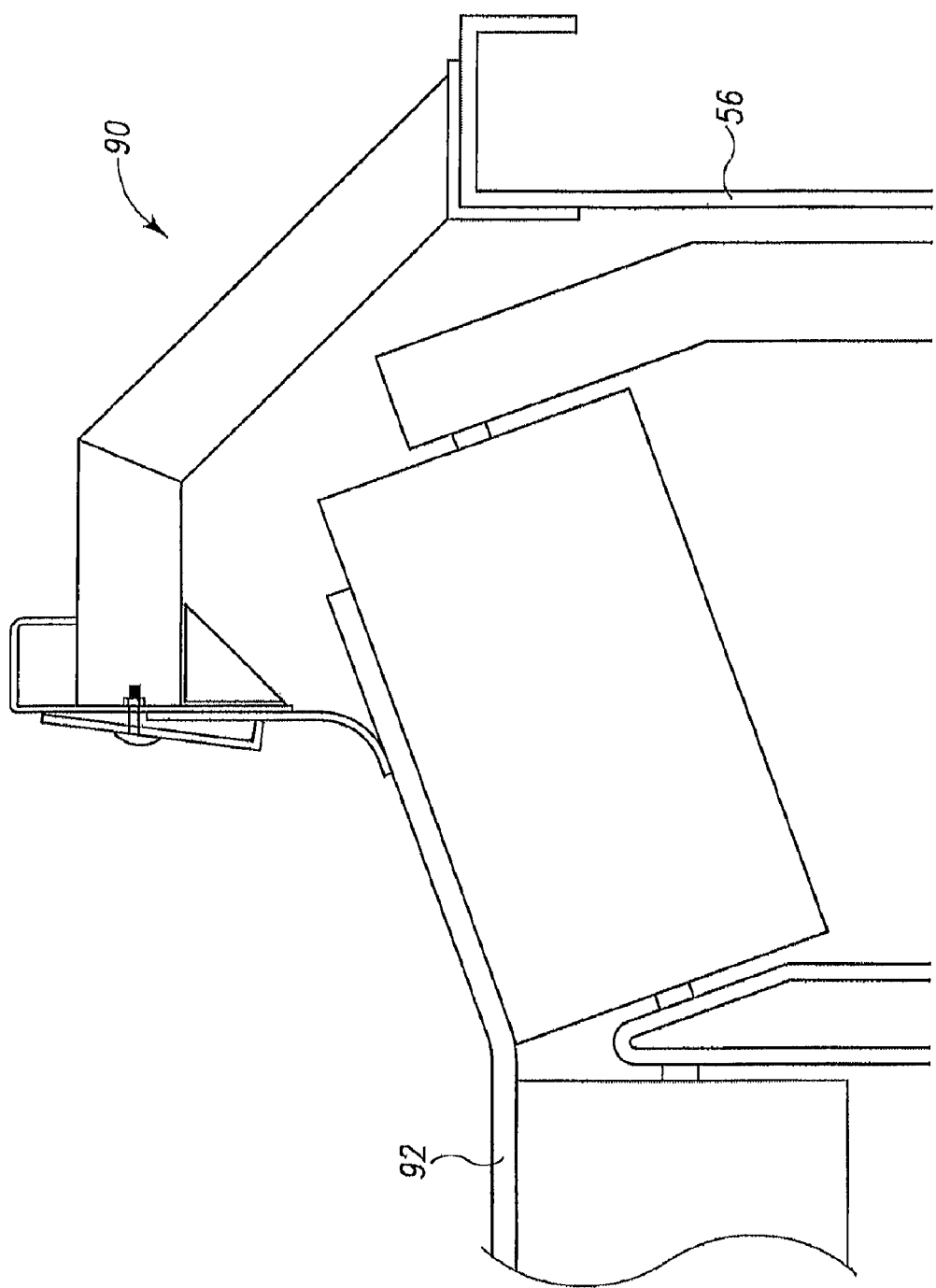
FIG. 22 is an enlarged view of a portion of FIG. 21.

A plurality of rollers 80, 82, 84, 86 and cross members 88 are coupled to and extend between the rails 56 to couple the rails 56 together in a fixed position relative to each other. Additionally, a plurality of troughing rollers 78 each include three rollers 78A, B, C that form a part of a standardly configured conveyor skirting mechanism or skirt board attachment 90 commonly utilized on conveyors that transfer loose materials, as shown, for example, in FIGS. 21 and 22 (annotations on FIG. 22 explain the configuration of the skirt board and thus, no additional description will be provided). The rollers 78, 80, 82, 84, 86 also provide surfaces against which the inner surface of the conveyor belt 16 rides.

In one embodiment, as shown, for example in FIG. 9, each of the end components of the conveyor 10 include a plurality (illustratively six on the load end component 36 and two on the discharge end component 38) of picking feeder idler (or troughing) rollers 78 forming a portion of the skirt board assembly 90 which includes a frame cross member 92 extending between and coupling the inwardly extending flanges 60 of the rails 56 forming the conveyor frame 14. The troughing rollers 78 provide surfaces against which the inner surface of the conveyor belt 16 rides during operations. In one specific embodiment the troughing rollers 78A, B, C have a diameter of approximately five inches.

Figure 20:
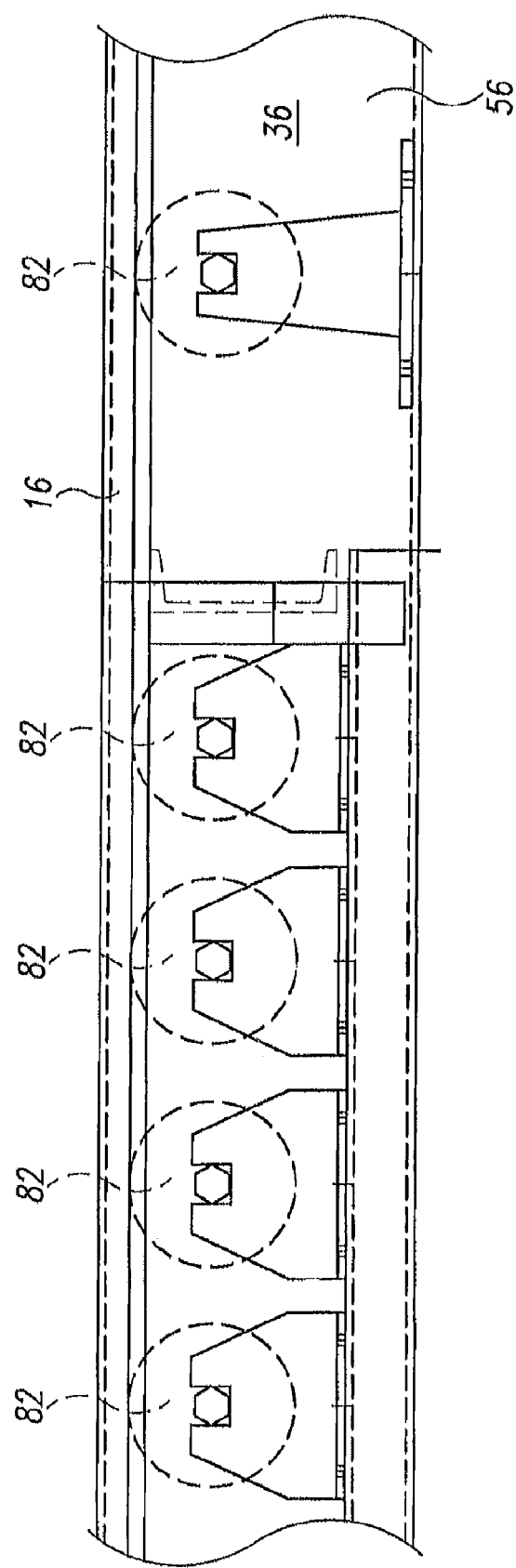
FIG. 20 is a simplified view of the load end of the load end component of the articulating frame.

In the illustrated embodiment, a plurality of return idler rollers 80 (illustratively three on the load end component 36 and one on the discharge end component 38) extend between and couple brackets extending downwardly from the rails 56. In one specific embodiment the return idler rollers 80 have a diameter of approximately five inches. These rollers 78, 80 are mounted to allow the rollers to rotate as the conveyor belt is driven across their surfaces. Additionally, a plurality (illustratively five) flat belt idlers 82 extend between parallel rails 56 of the load end component 36 adjacent the proximal or load end 32 to provide a surface against which the inside surface of the conveyor belt 16 rides. These flat belt idlers 82 are also mounted to allow the idlers to rotate as the conveyor belt 16 is driven across their surfaces. In one specific embodiment flat belt idlers 82 have a diameter of approximately five inches. One embodiment of a method of mounting the flat belt idlers 82 to the load end component 36 using brackets is shown, for example, in FIG. 20 which contains explanatory annotations.

At the proximal end 32 of the load end component 36 an winged tail pulley 84 extends between and couples the parallel rails 56. The tail pulley 84 is mounted to rotate as the conveyor belt 16 is driven across its surface. In one specific embodiment tail pulley 84 is eight inches in diameter.

Figure 23:
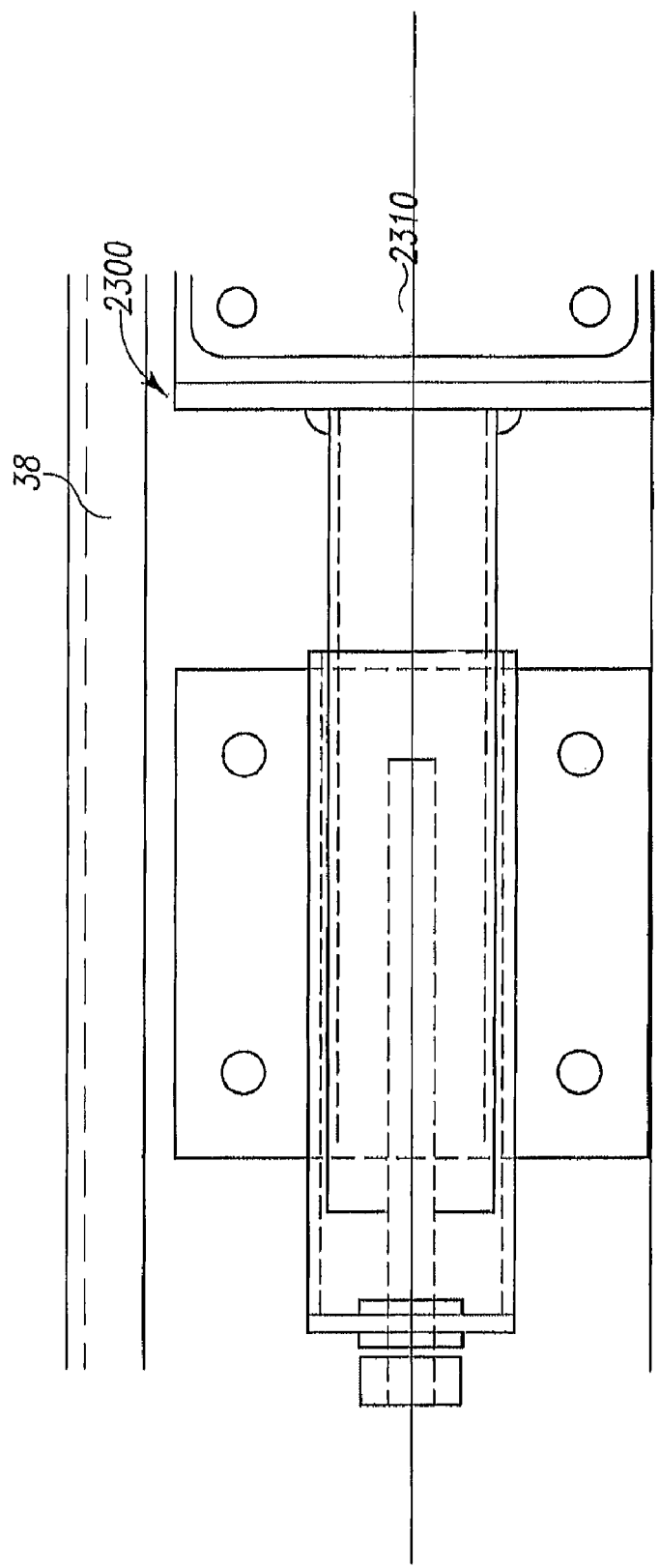
FIG. 23 is view of a belt tensioning mechanism for tensioning the main conveyor belt.
Figure 24:
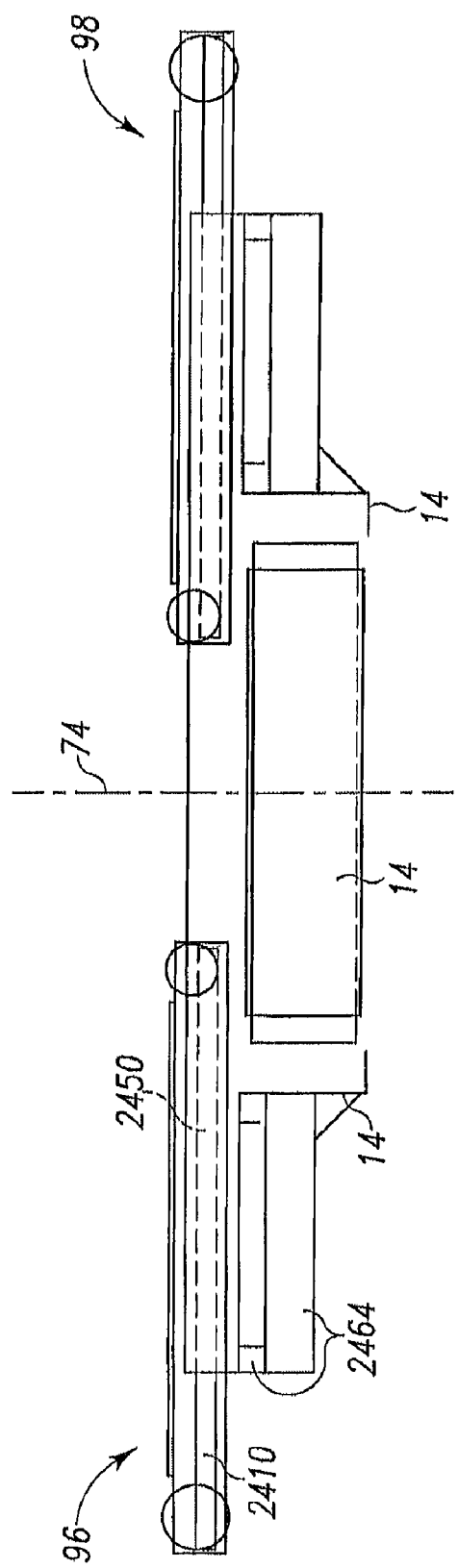
FIGS. 24 and 25 are views of the material handling mechanism with the hoppers removed.
Figure 25:
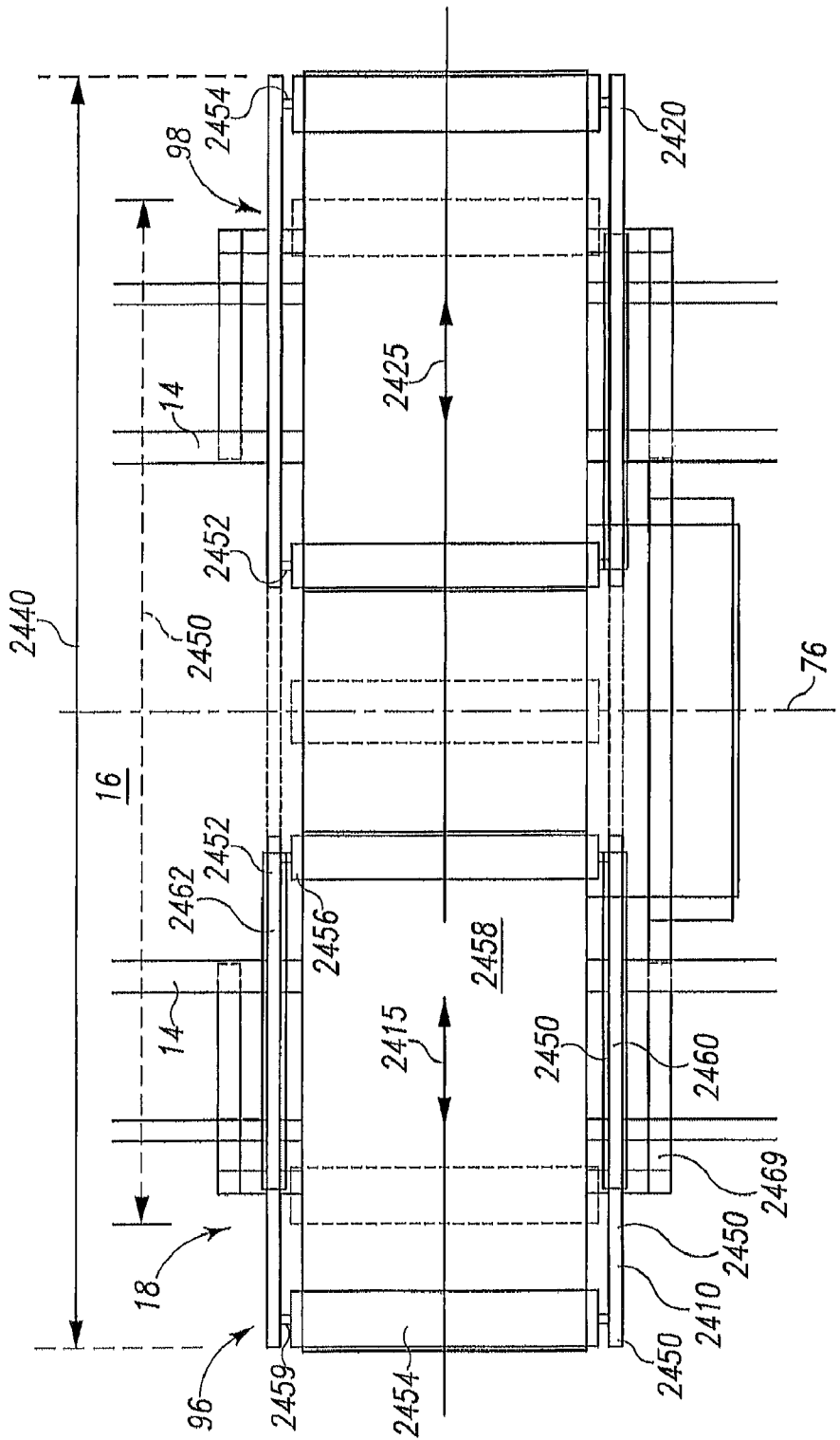

At the distal (discharge) end 34 of the discharge end component, a driven crowned head pulley 86 extends between the mounting end plate 2310 of a pair of tensioning mechanisms 2300, one of which is shown, for example, in FIG. 23. The tensioning mechanisms 2300 are of the standard type utilized in conveyors to maintain appropriate belt tension and will not be explained in any greater detail than is provided in the annotations contained in FIG. 23. A tensioning mechanism 2300 is attached to each rail 56 adjacent the discharge end of the discharge end component 38 as shown in the drawings. The crowned head pulley 86 is driven to rotate about an axis perpendicular to the longitudinal axis of the conveyor frame 14 so that its outer surfaces engage the inner surface of the conveyor belt 16, driving the conveyor belt 16 to rotate as restrained by rollers, idlers and pulleys 78, 80, 82, 84, 86. In one specific embodiment crowned head pulley 86 is twelve inches in diameter and is hydraulically driven by a hydraulic motor powered by the hydraulic system 53.

In the illustrated embodiment, the conveyor belt 16 is has a width 87. The length of each of the rollers 78, 80, 82, 84, 86 and cross members 88 is dictated by the width 87 of the conveyor belt 16 to be used and the dimensions of the rails 56 and mounting locations of the rollers 78, 80 and cross members 88. As can be seen, the rollers 78, 80, 82, 84, 86 and cross members 88 are generally equally spaced along the conveyor frame 14, with a cross member 88 being disposed between each roller 65. Those skilled in the art will recognize that the number location length and diameter of the rollers 78, 80, 82, 84, 86 and cross members 88 may be varied depending on the dimensions of the conveyor frame 14 and conveyor belt 16 and the anticipated load weights to be transferred.

As shown, for example, generally in FIGS. 1, 2, 8 and more particularly in FIGS. 10-19, one embodiment of the frame articulation mechanisms 20 includes a pair of oppositely disposed conveyor fold joints 100, a pair of locking mechanisms 160, a locking mechanism actuator and linkage 200, a pair of fold actuators 240. Each conveyor fold joint is a mirror image of the other so only one joint 100 is illustrated. Each conveyor fold joint 100 is fabricated by attaching appropriate plates 102, 104, bushings 106, fasteners 108, 110, and pins 112 to the distal end 42 of the load end component 36 and the proximal end 44 of the discharge end component 38. In the illustrated embodiment, the inwardly extending flange of the rails 56 forming the load and discharge end components 36, 38 are notched adjacent the distal end 42 and proximal end 44, respectively, to accommodate the plate 102 and one of the bushings 106 of the conveyor fold joint 100. In the illustrated embodiment, plates 102 and 104 are identically configured and simply oriented in opposite directions for attachment to the distal end 42 of the load end component 36 and the proximal end 44 of the discharge end component 38.

Since plates 102 and 104 are identical and are simply oriented in opposite directions, only plate 102 is illustrated separately in plan view. Each plate 102 is formed from an appropriately thick plate, in one example, a ¾ inch steel plate. The illustrated plate is generally in the shape of a right triangle with the corners rounded. The height 118 of the plate 102 is such that when the base (shown to the top in FIG. 12 is positioned to engage the bottom surface of the outwardly extending flange 62 of the rail 56 a pin-receiving hole 120 may be formed in the body of the plate 102. The length 122 of the base is sufficient to have approximately 1¾ inches if the plate 102 extend beyond the end of the rail to which it is attached so that the center of the pin-receiving hole is positioned directly below the end of the rail 56. In one specific embodiment, the center of the pin-receiving hole 120 is displaced from the bottom of the rail 56 by approximately two inches.

The bushing 106 includes a cylindrical section 128 having an outside diameter 130 and a flange section 132 having an outside diameter 134. The flange section 132 has a width 136 approximately equal to the thickness of the plate 102. The cylindrical section 128 has a length 138. The bushing is formed to include a central pin-receiving bore 140 extending therethrough having an inside diameter 142 slightly greater than but approximately equal to the diameter of the pin 112 so that the pin 112 can be received therein.

One bushing 106 is welded to plate 102 which is welded to the discharge end component 38 positioned and arranged as shown in the drawings. Another bushing 106 is welded to plate 104 which is welded to the load end component 36, positioned and arranged as shown in the drawings. The a pin 116 is received through the pin receiving bores 140 of bushings 106 attached to plates 102 and 104 and through the pin-receiving holes of the plates 102, 104 to pivotally couple the plates 102, 104 and consequently the end components 36, 38 together for pivotal movement about pivot axis 46.

Figure 11:
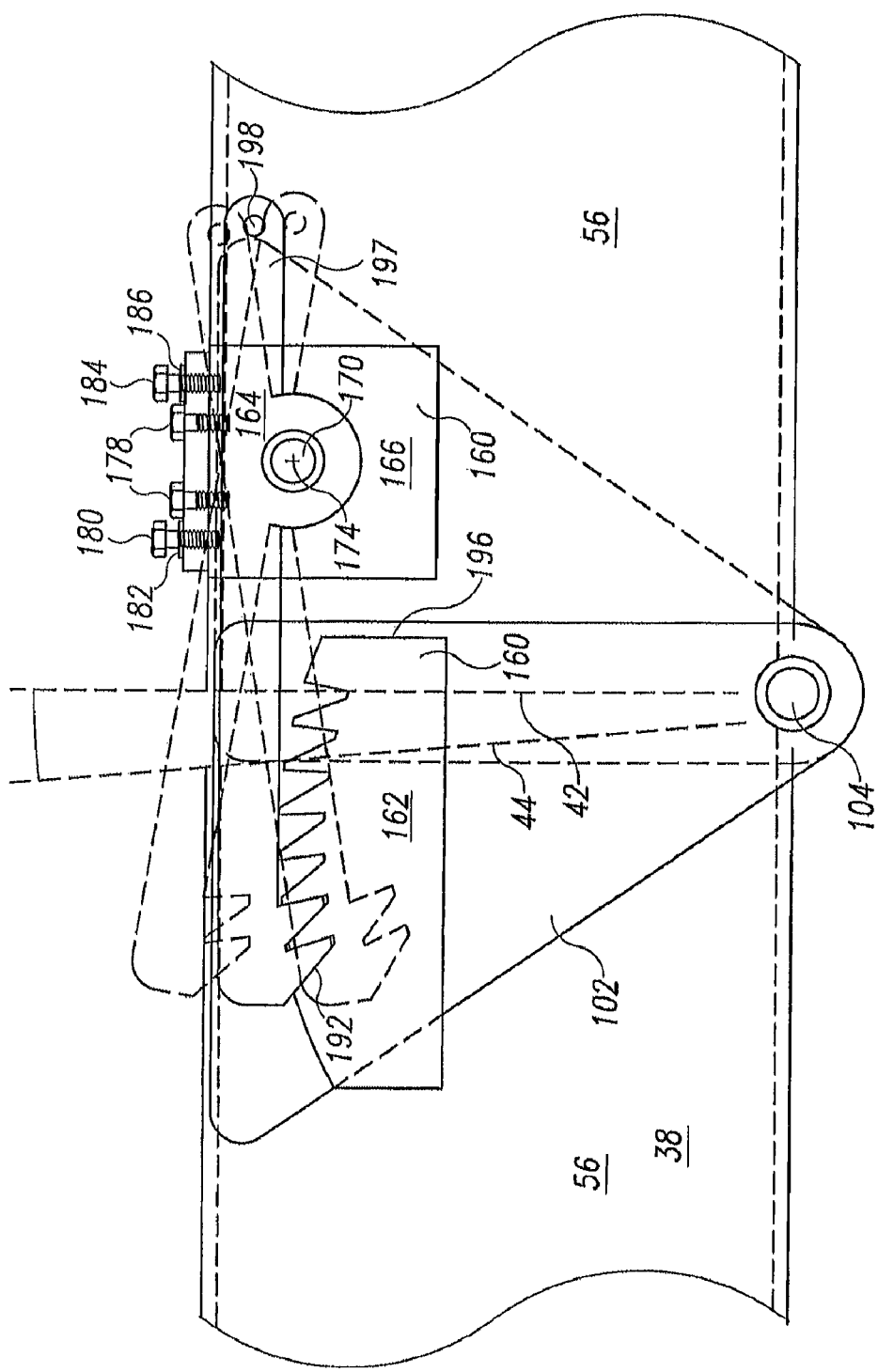
FIG. 11 is a side elevation view looking in the direction of arrows 11-11 in FIG. 10 of the conveyor fold joint mechanism.
Figure 15:
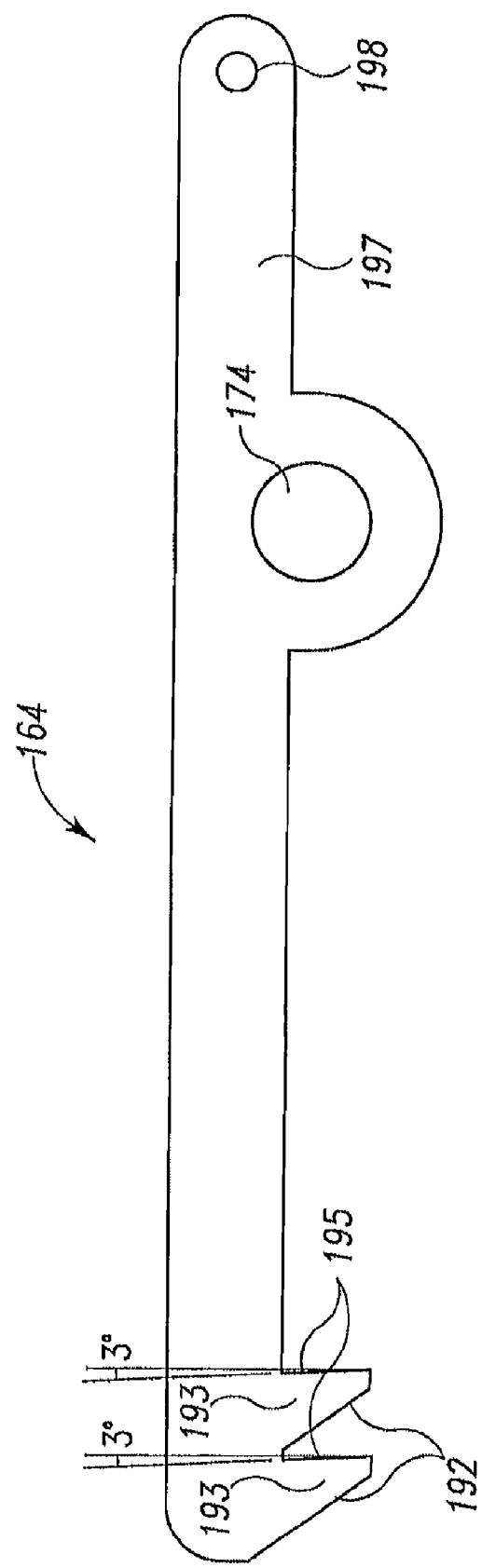
FIG. 15 is a plan view of the dawg of the conveyor fold joint mechanism.
Figure 16:
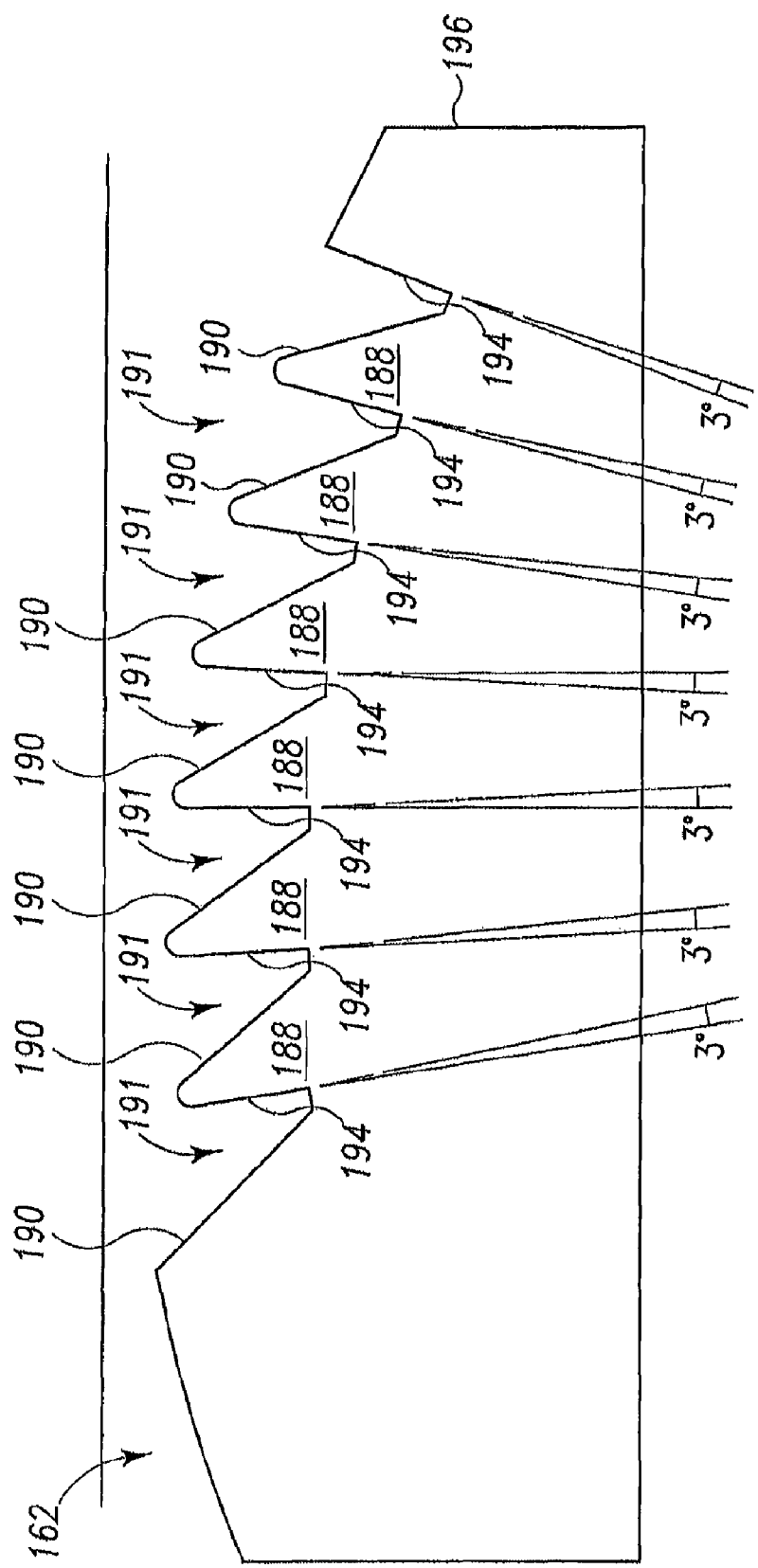
FIG. 16 is a plan view of the jaw of the conveyor fold joint mechanism.

As shown, for example, in FIG. 11, the proximal end 44 of the discharge end component 38 is cut on an angle 124 to permit over extension of the discharge end component 38 beyond straight alignment with the load end component 36. Over extension facilitates the usage of the locking mechanisms 160 as will be explained hereunder. In one specific embodiment, the angle is approximately three degrees, resulting in the gap seen between the end components 36, 38 in FIG. 10.

The lock mechanism 160 includes a pawl or jaw 162, a dawg or ratchet 164, an offset block 166, a stop plate 168 and a pin 170. As shown, for example, in FIGS. 10 and 11, the offset block is mounted to the inner surface of the upright 58 of the rail 56 forming the load end component 36, the pin 170 is inserted in the pin-receiving hole 172 formed in the block 166 and the dawg 164 is mounted to the block 166 for pivotal movement about the axis 174 of the pin 170 by having the pin be received in a pin-receiving hole 176 formed in the dawg 164. The stop plate is formed to include two connection holes through which connection bolts 178 extend to secure the stop plate to the top of the block 166. The stop plate is also formed to include two threaded holes through which an upward limiter bolt 180 with lock nut 182 and a downward limiter bolt 184 with lock nut 186 pass.

The upward limiter bolt 180 is screwed through the stop plate 168 until the end engages the top surface of the dawg 164 when the tooth end of the dawg 164 has pivoted to its desired upward limit of pivotal motion, as shown, for example, in phantom lines in FIG. 11. Its associated lock nut 182 received on its shaft is then tightened against the upper surface of the stop plate 168 to set the upward limit of pivotal motion of the tooth end of the dawg 164.

The downward limiter bolt 184 is screwed through the stop plate 168 until the end engages the top surface of the dawg 164 when the tooth end of the dawg 164 has pivoted to its desired downward limit of pivotal motion, as shown, for example, in phantom lines in FIG. 11. Its associated lock nut 186 received on its shaft is then tightened against the upper surface of the stop plate 168 to set the downward limit of pivotal motion of the tooth end of the dawg 164.

The jaw 162 is formed to include several back cut teeth 188 positioned approximately five degrees apart. Each tooth has a ramped surface 190 against which an inclined surface 192 of a tooth 193 of the dawg 164 may ride up when received in the valley 191 between two teeth 188 as the discharge end component is rotated toward the transfer configuration. Each tooth 188 also includes a back cut stop surface 194 against which a back cut stop surface 195 of a tooth 193 engages when it is received in a valley 191 between two teeth 188 of the jaw 162. In both the jaw 162 and the dawg 164, the back cut angle is approximately three degrees. As a result of this back cut configuration of the teeth 188 of the jaw 162 and the teeth of the dawg 164, once two teeth of the dawg 164 are received in the valleys 191 between two adjacent teeth 188 of the jaw 162 and the back cut surfaces 194, 195 are in engagement, rotational forces tending to move the discharge end of the conveyor 10 downwardly induce stronger engagement of the teeth 188, 193, as do forces tending to cause upward pivotal movement of the tooth end of the dawg 164.

Thus, once two teeth of the dawg 164 are received in the valleys 191 between two adjacent teeth 188 of the jaw 162 and the back cut surfaces 194, 195 are in engagement with the discharge end component must be pivoted upwardly three degrees before the teeth of the dawg can be disengaged from the teeth of the jaw. Since the dawg 164 and jaw 162 are configured and arranged so that when the two teeth of the dawg 164 are received in the furthestmost valleys 191 of the jaw 162, the discharge end component 38 and load end component 36 are aligned, as shown, for example, in FIG. 17, it is necessary to provide the ability to rotate the discharge end component at least three degrees past alignment which explains the presence of the three degree cut applied to the proximal end of the discharge end component 38.

The jaw 162 is also configured to include a sloped leading edge 196 against which the sloped front surface 192 of the front tooth 193 of the dawg 164 comes into engagement which urges the tooth end of the dawg 164 to rotate upwardly. Because the teeth and valleys of the jaw are positioned in five degree increments, as the two teeth of the dawg fall into valleys of the jaw 162 closer and closer to the load end component, the relative alignment of the end components can be adjusted in five degree increments.

Figure 17:
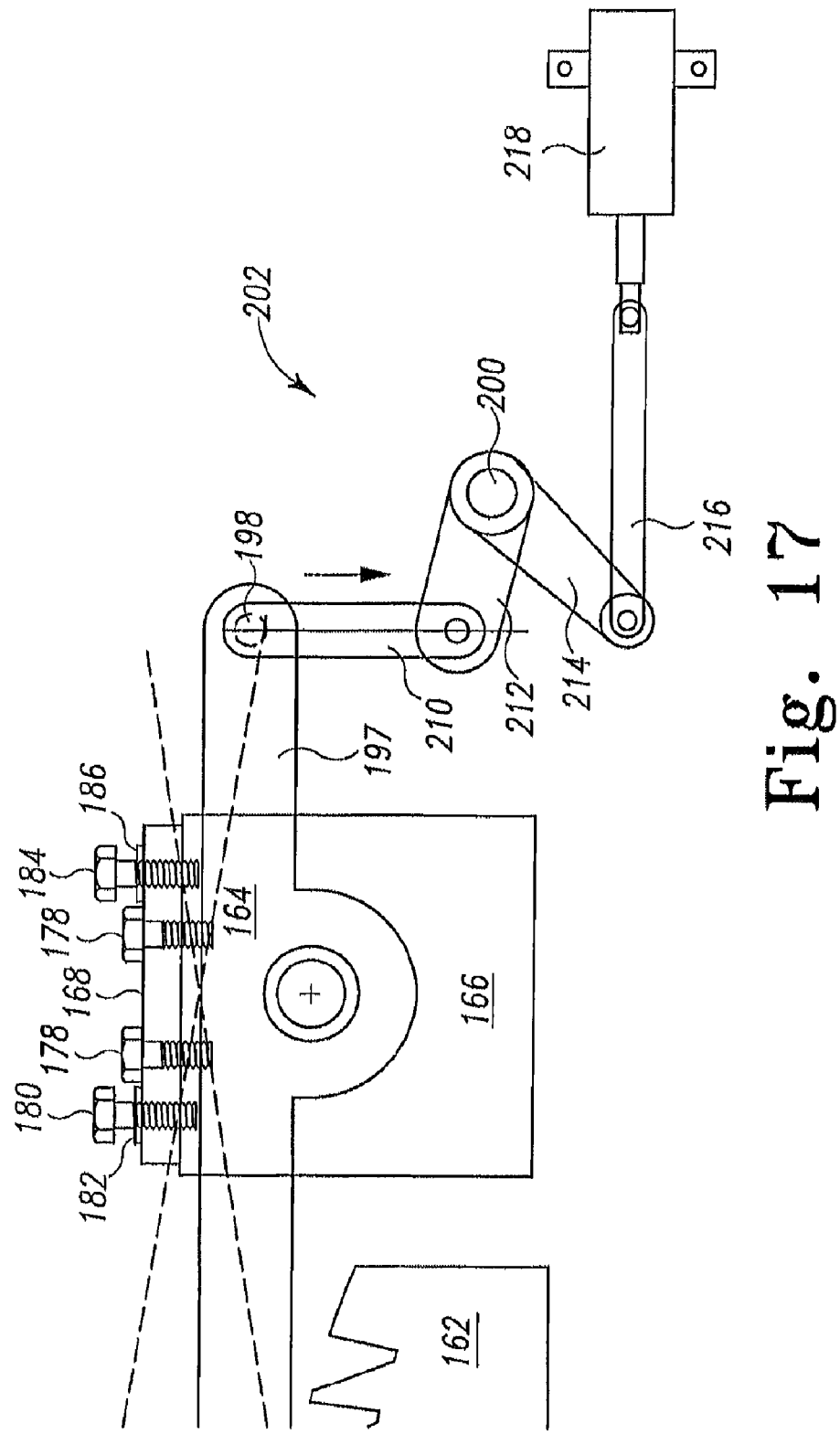
FIGS. 17 and 18 are views of the locking mechanism actuator and linkage 200.
Figure 18:
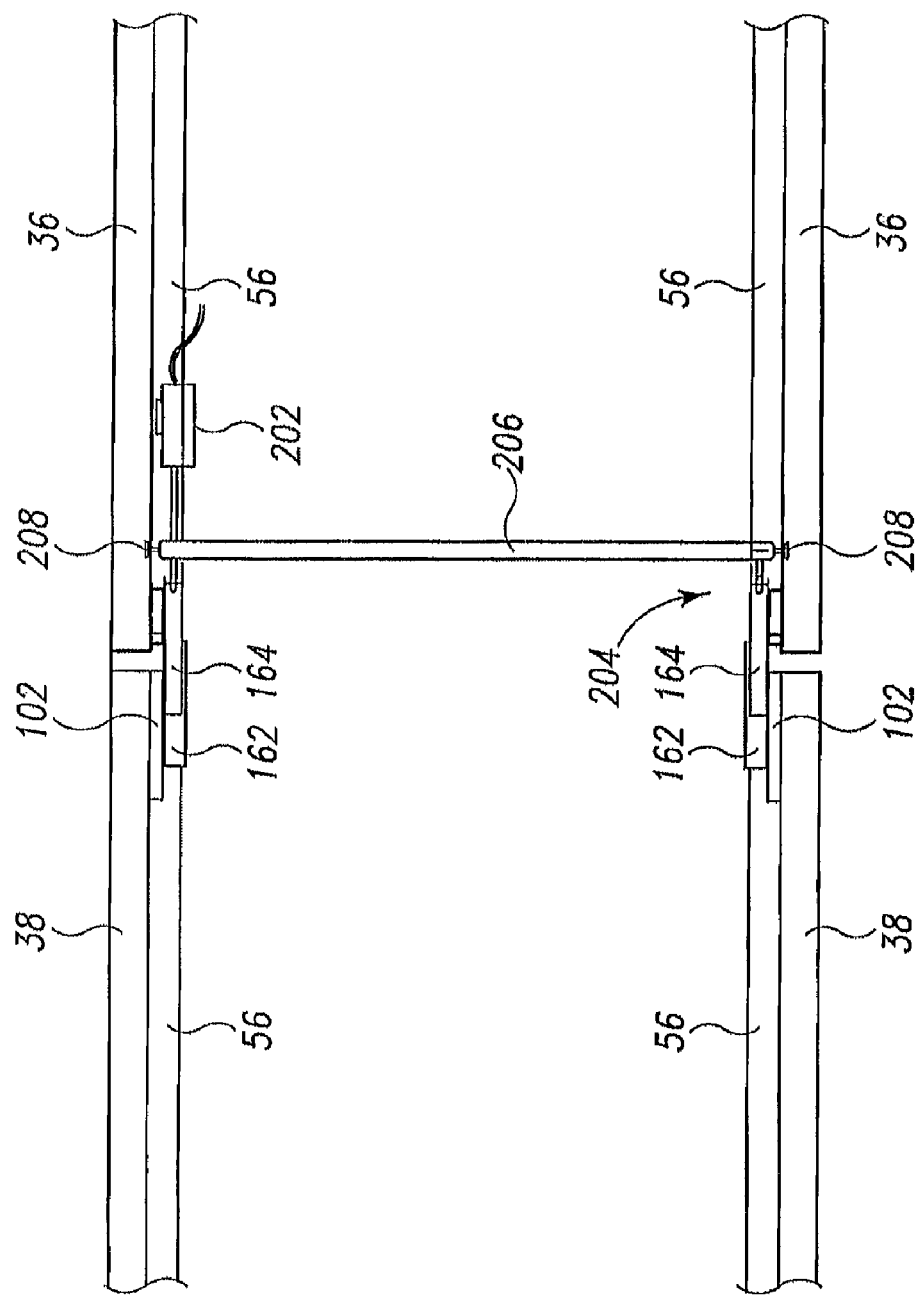

The dawg 164 is configured to include a cantilevered linkage arm 197 extending toward the load end of the conveyor 10 which is finned to include a linkage coupling hole 198 to which one link of the locking mechanism actuator and linkage 200 is pivotally coupled. The locking mechanism actuator and linkage 200 include a first rail assembly 202, a second rail assembly 204 and a linkage shaft 206, as shown for example in FIGS. 17 and 18. The opposite ends of the linkage shaft 206 are mounted with pivot pins 208, such as shoulder bolts, to the rails of the load end component 36. The first rail assembly 202 includes a linkage 210, a clip 212, a clip 214, a linkage 216 and a solenoid 218. The linkage 210 is pivotally coupled to the linkage arm of the dawg 164 and to the clip 212 as shown in FIG. 17. The clip 212 is rigidly mounted to the linkage shaft 206 as is the clip 214. The clip 214 is pivotally mounted to the linkage 216 which is pivotally mounted to the shaft of the solenoid 218. The second rail assembly includes a clip 212 mounted to the shaft 206 and a linkage 210 pivotally coupled to the clip 212 and to the link arm of the dawg 164. Reciprocal movement of the shaft of the solenoid induces pivotal movement of the linkage shaft 206, which induces pivotal movement of the dawgs 164. Retraction of the shaft of the solenoid 218 induces release of the teeth of the dawgs 164 from the teeth of the jaws 162. The teeth are only actually released if the discharge end has been raised three degrees upward relative to its previously locked position as explained above. This provides a safety feature that reduces the likelihood of undesirable downward rotation of the discharge end of the conveyor.

Figure 19:
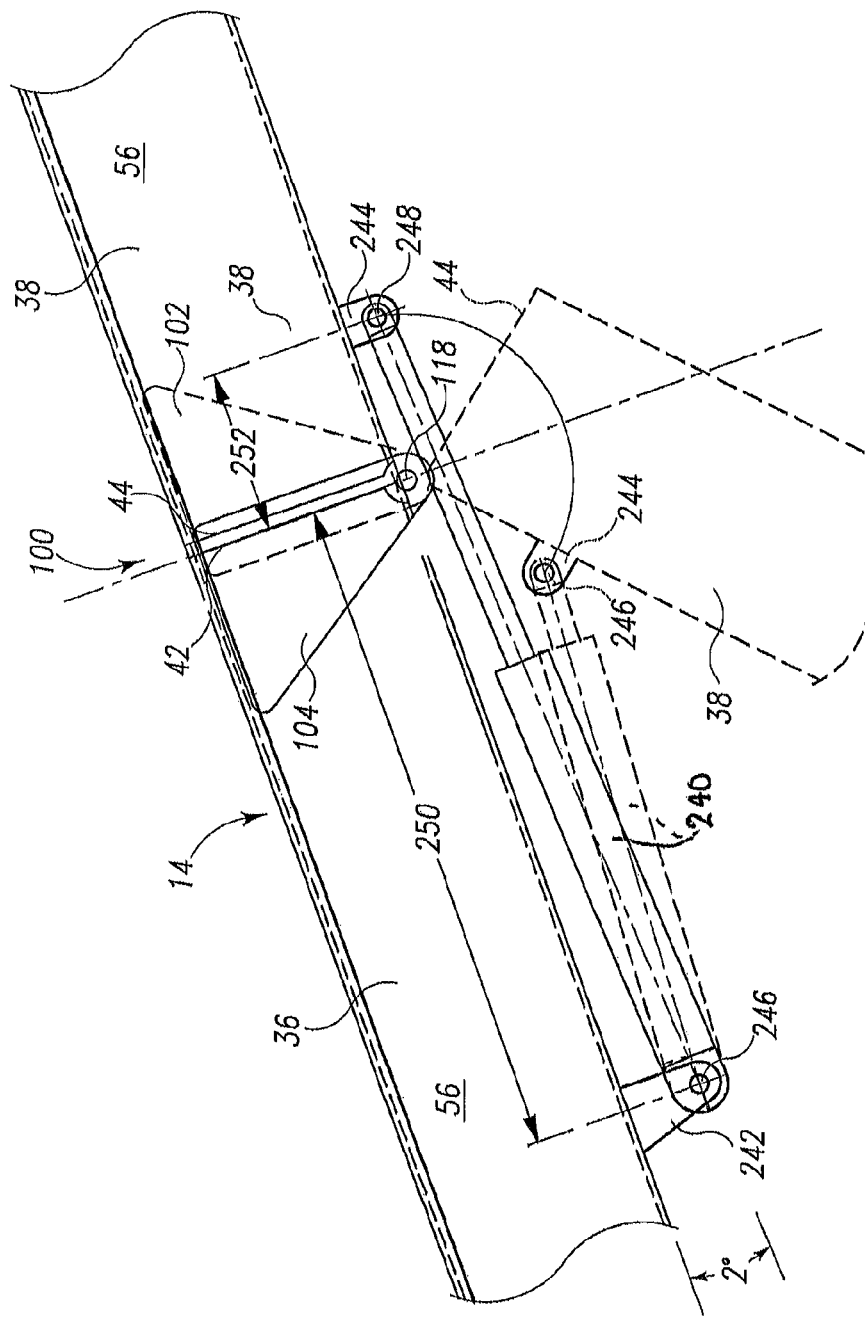
FIG. 19 is a plan view of a portion of the frame articulation mechanism 20 including the conveyor fold joint, and the fold actuator

As shown for example, in FIG. 19 the fold actuator 19 may be a hydraulic cylinder pivotally mounted at one end to a bracket 242 welded to and extending downwardly from one rail of the load end component 36 and pivotally mounted at the other end to a bracket 244 welded to and extending downwardly from one rail discharge end component 38. An identical cylinder 240, bracket 242 and bracket 244 are mounted to the opposite rails of the end components 36, 38. The pivot axes 246, 248 about which the cylinder is pivotally mounted to the brackets 242, 244 are displaced downwardly from the bottoms of the rails. In one embodiment both pivot axes 246, 248 are displaced downwardly from the rails by approximately two inches. The pivot axis 246 is displaced toward the load end from the distal end 42 of the load end component 36 by a displacement 250. In one embodiment, the displacement 250 is approximately forty-two inches. The pivot axis 248 is displaced toward the discharge end from the proximal end 44 of the discharge end component 36 by a displacement 252. In one embodiment, the displacement 252 is approximately twelve inches. As shown, for example, in phantom lines in FIG. 19, when the piston of the hydraulic cylinder 240 is fully retracted, the conveyor frame 14 assumes the transport configuration. When the piston of the cylinder is fully extended, the conveyor frame 14 assumes an aligned transfer configuration.

Once the piston has extended sufficiently to allow the two teeth 193 of the dawg 164 to fall into the two closest valleys 191 of the jaw 162, further extension of the piston can be stopped and the conveyor frame can assume a transfer configuration wherein the discharge end component forms an obtuse angle with the load end component. Due to the arrangement of the teeth this obtuse angle would be approximately 160 degrees. The obtuse angle can be increased in five degree increments until the discharge and load end components are aligned (when the teeth 193 of the dawg 164 are in the farthest valleys 191 of the jaw 162). The locking mechanism 160, as described above acts to lock the end components in any of the above described transfer configurations thereby relieving the cylinder 240 from maintaining the configuration and preventing the discharge end from pivoting downwardly in the event of a loss of hydraulic pressure.

As shown, for example, in FIGS. 1, 3, 4, 8, 24-26, the material-receiving device 18 includes a hopper 94 and a pair of lateral conveyors 96, 98. The hopper 94 is configured with a bottom opening and sloped side walls which urges material dumped therein either onto the lateral conveyors 96, 98 or directly onto the main conveyor belt 16. The hopper walls include a first set of walls coupled to the sliding frame 2410 of the first lateral conveyor 96, a second set of walls coupled to the sliding frame 2420 of the second lateral conveyor 98, and a third load end wall rigidly mounted to the load end of the conveyor 10. The sliding frames 2410 and 2420 are slidably mounted via members rigidly secured to the conveyor frame 14 as shown in the drawings for reciprocal movement in the direction of arrows 2415 and 2425, respectively between a transport configuration (shown in phantom lines in FIG. 25) and a transfer configuration, shown in solid lines in FIGS. 24 and 25.

In the transfer configuration, the distance 2440 between opposite ends of lateral conveyors 96, 98 is at maximum. In one embodiment, the distance 2440 is preferably at least as wide as the widest dumping mechanism that will be delivering materials to the work site. In the transport configuration, the distance 2450 between opposite ends of lateral conveyors 96, 98 is at a minimum, the adjacent end may be touching, as shown, in FIG. 25. In one embodiment, the distance 2450 is equal to or less than the maximum width for a towed vehicle without the need to acquire permits, signage and or lead or chase vehicles. In one specific embodiment the distance 2450 is less than eight feet six inches.

Figure 5:
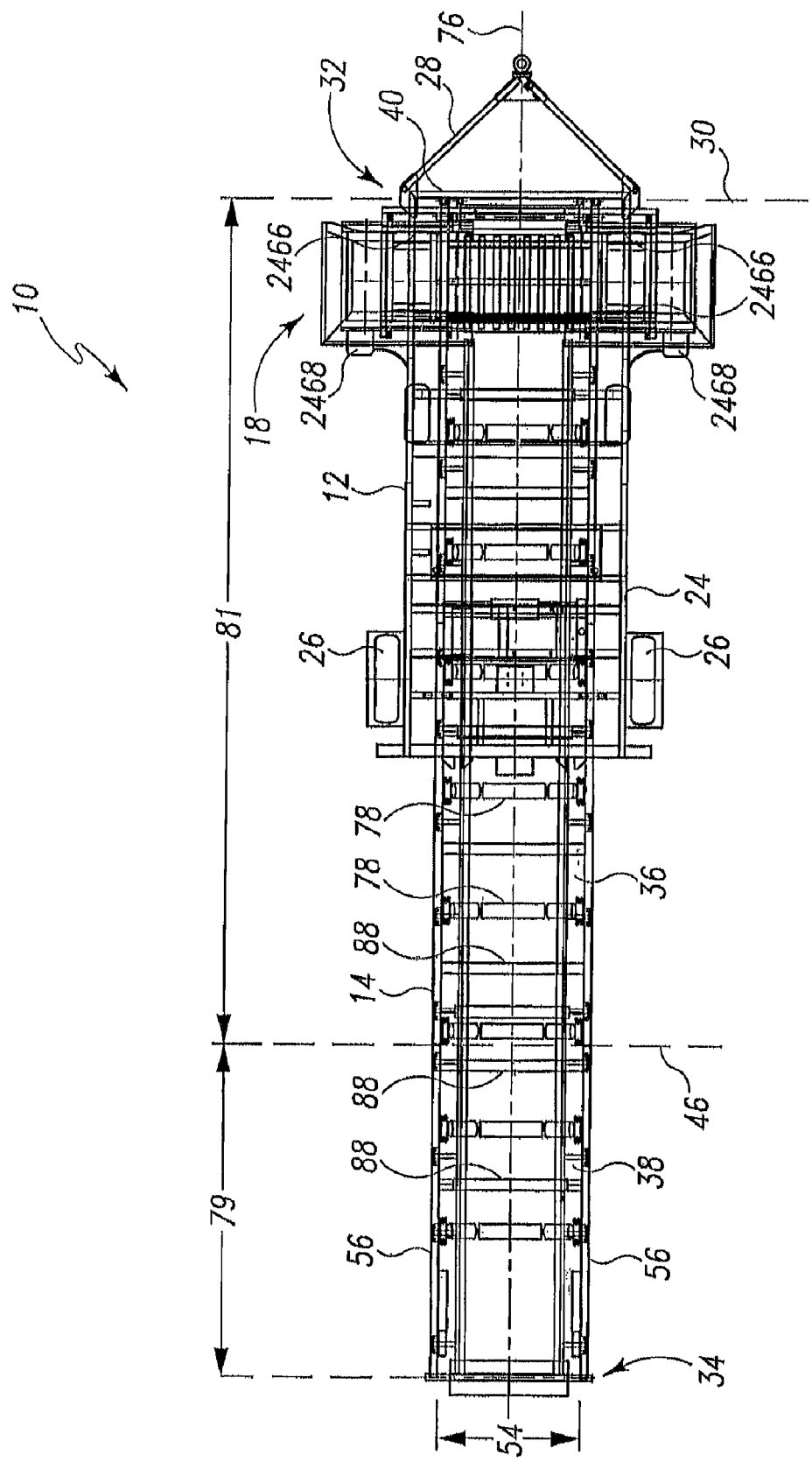
FIG. 5 is a plan view of the reload conveyor in a material transfer configuration.
Figure 6:
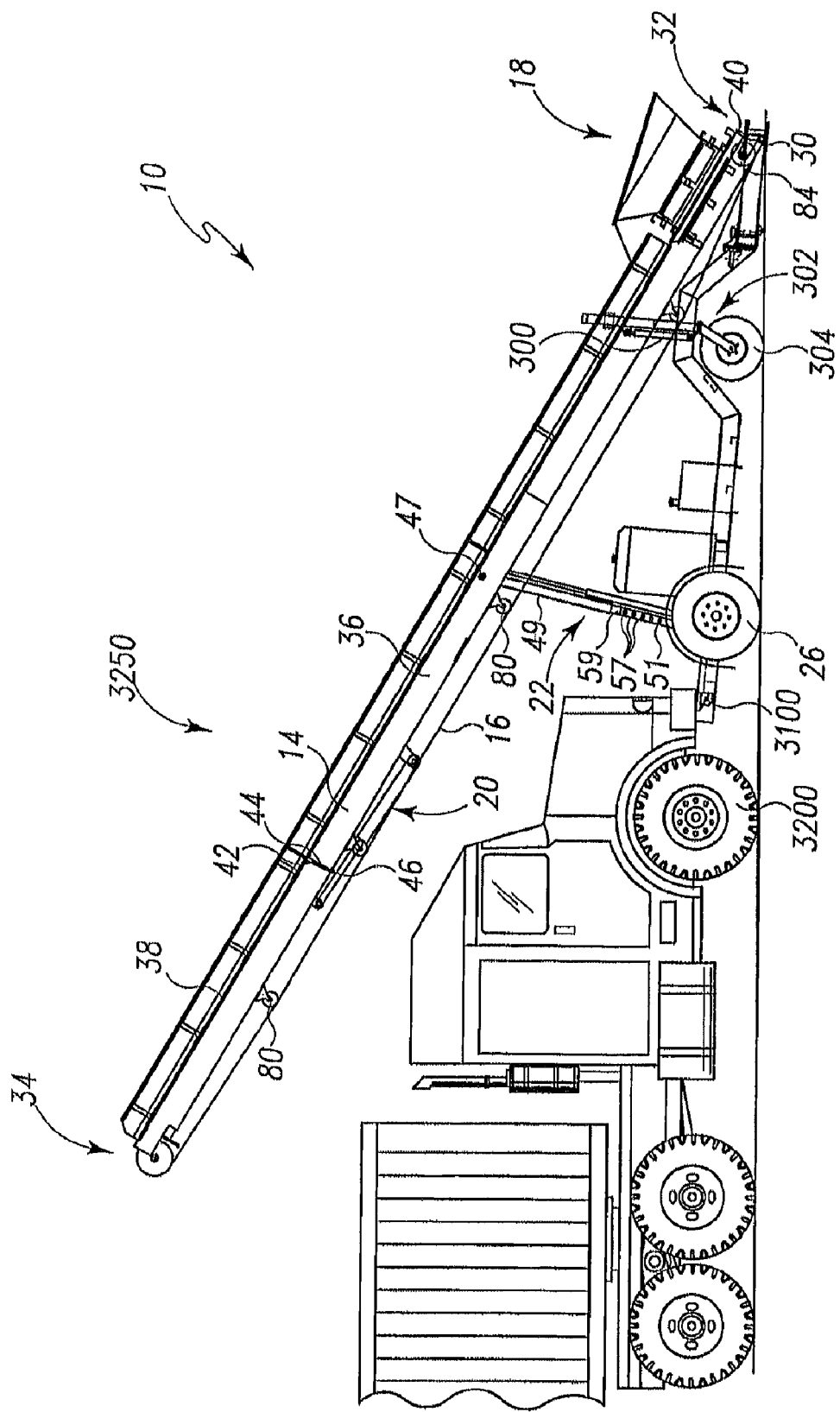
FIG. 6 is side view of the reload conveyor attached to be pushed by a spreader/slinger.
Figure 7:
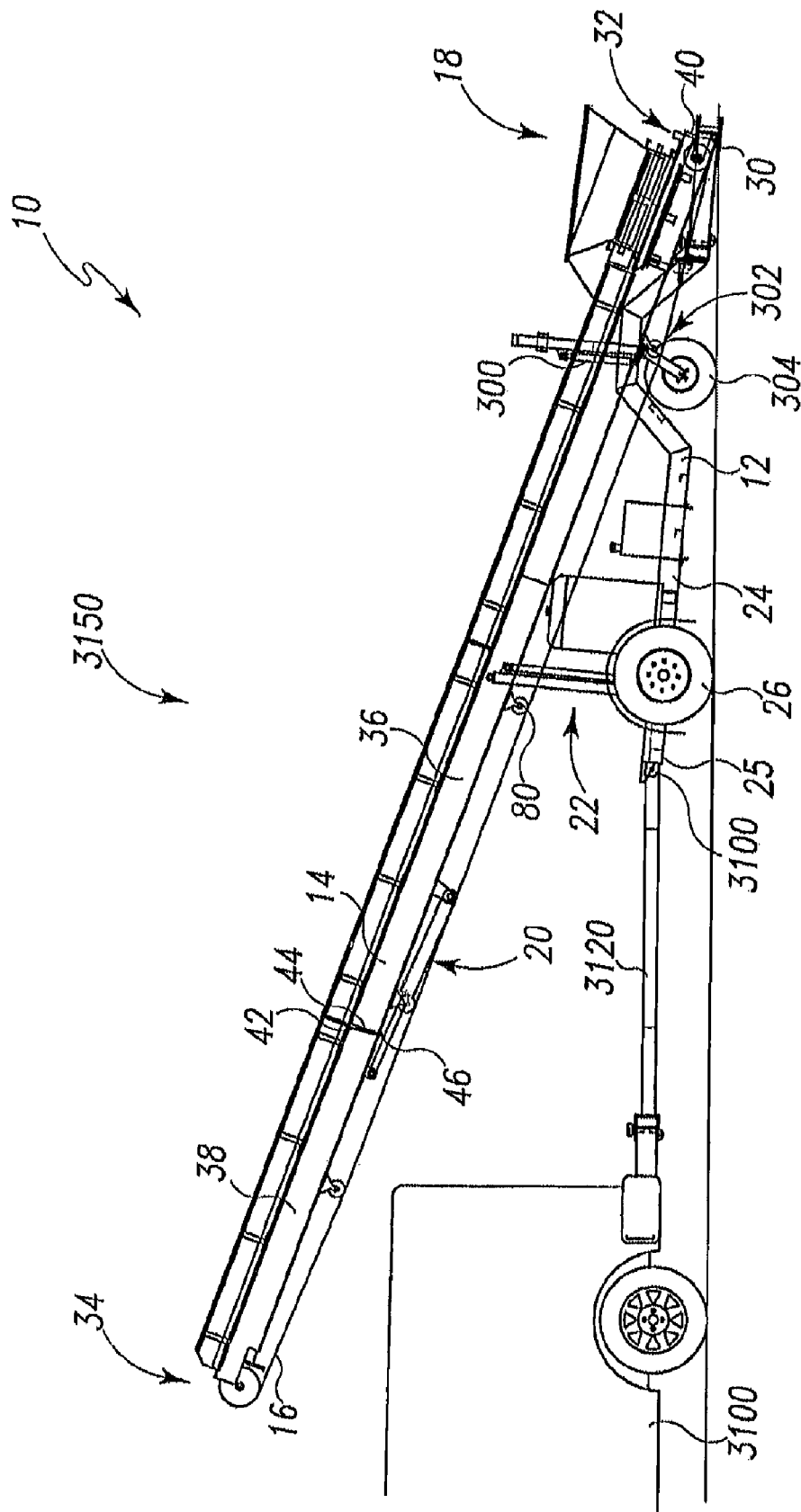
FIG. 7 is side view of the reload conveyor attached to be pulled by a spreader/slinger.

In the illustrated embodiment each lateral conveyor 96, 98 is a mirror image of the other, therefore, only one will be described. Lateral conveyor 96 includes a load end slide frame member 2450, an opposite slide frame member 2452, a drive roller 2454, an idler roller 2456, a belt 2458, a load end slide tube 2460, an opposite end slide tube 2462, a stationary frame assembly 2464 and a cylinder 2466 (FIG. 5). The slide tubes 2460, 2462 are mounted in a fixed position to the stationary frame assembly 2464 which is mounted to the conveyor frame 14. The load end slide frame member 2450 is slidably received within the load end slide tube 2460 and the opposite slide frame member 2452 is slidably received in the opposite slide tube 2462. The drive roller 2454 and idler roller 2456 are mounted parallel to each other and perpendicular to the slide frame members 2450, 2452 to rotate relative to their axes of rotation. The conveyor belt 2458 is disposed around the drive roller 2454 and idler roller 2456. The drive roller 2454 is driven by a hydraulic motor 2468 (FIGS. 1-4 and 5) the cylinder 2466 (FIG. 5) is mounted at one end to the to the slide frame 2410 and at the other end to the conveyer frame 14 or another stationary location so that extension and retraction of the piston of the cylinder induces the reciprocal liner lateral movement of the slide frame 2410 depicted by arrow 2415. While a specific slid mechanism has been described it is within the scope of the disclosure for other unknown means to be used to cause the lateral reciprocal linear movement of the side conveyors.

The tow hitch assembly 28 is mounted to the load end of the trailer frame 24 of the conveyor 10, as shown, for example, in FIGS. 1, 2, 5, and 26-30. The tow hitch assembly 28 includes two frame member 2610, 2620, upper and lower frame member joining plates 2630, four frame member to trailer coupling plates 2640, four trailer to frame member coupling plates 2650, two frame member pivot pins 2660, two frame member to trailer locking pins 2670 and a frame member to frame member locking pin 2680.

One end of each frame member 2610, 2620 has a frame member to trailer coupling plate welded to the top and bottom of the frame member arranged and configured, as shown, for example, in FIGS. 1, 2, 5, 27, 26. The frame member 2610 has upper and lower frame member joining plates 2630 welded to the opposite end. Frame member 2620 has a pin-receiving hole extending through it adjacent the other end from the top to the bottom. Opposite sides of the trailer frame 24 have trailer to frame member coupling plates 2650 welded to the top and bottom of a frame side and end component arranged and configured, as shown, for example, in FIGS. 1, 2, 5, 27, 26. The upper and lower frame member joining plates 2630 are configured in the manner shown in FIG. 30 and is formed to include a pin-receiving hole 3010.

Figure 28:
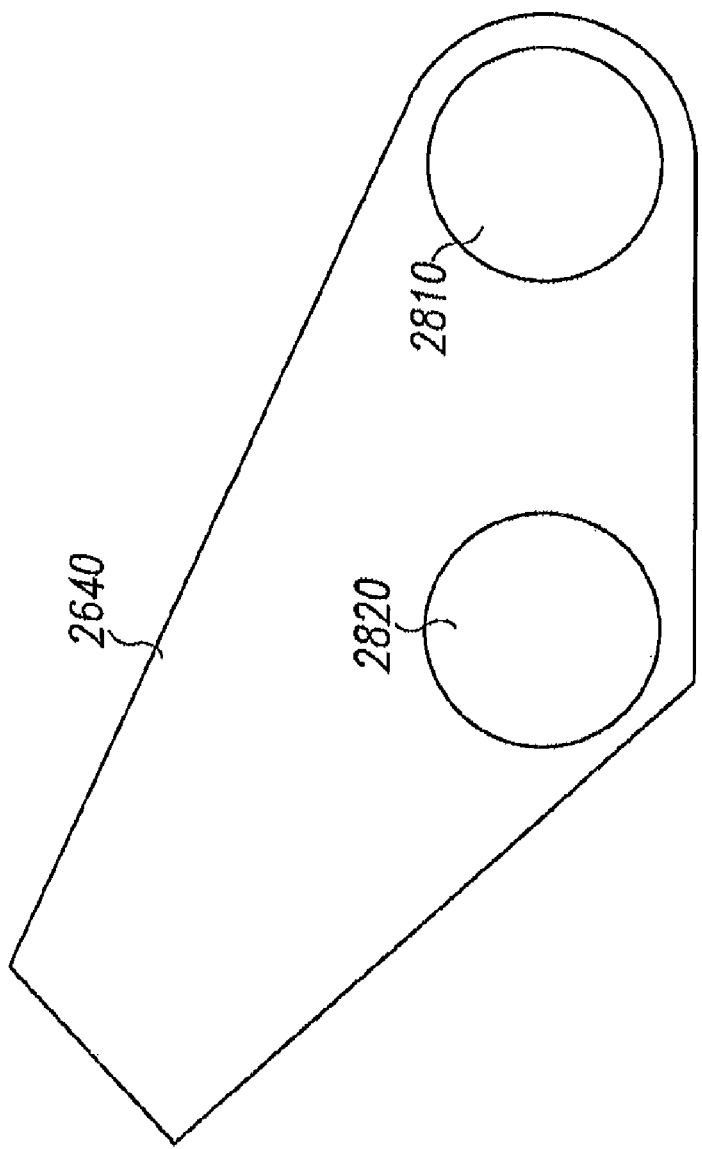
Figure 29:
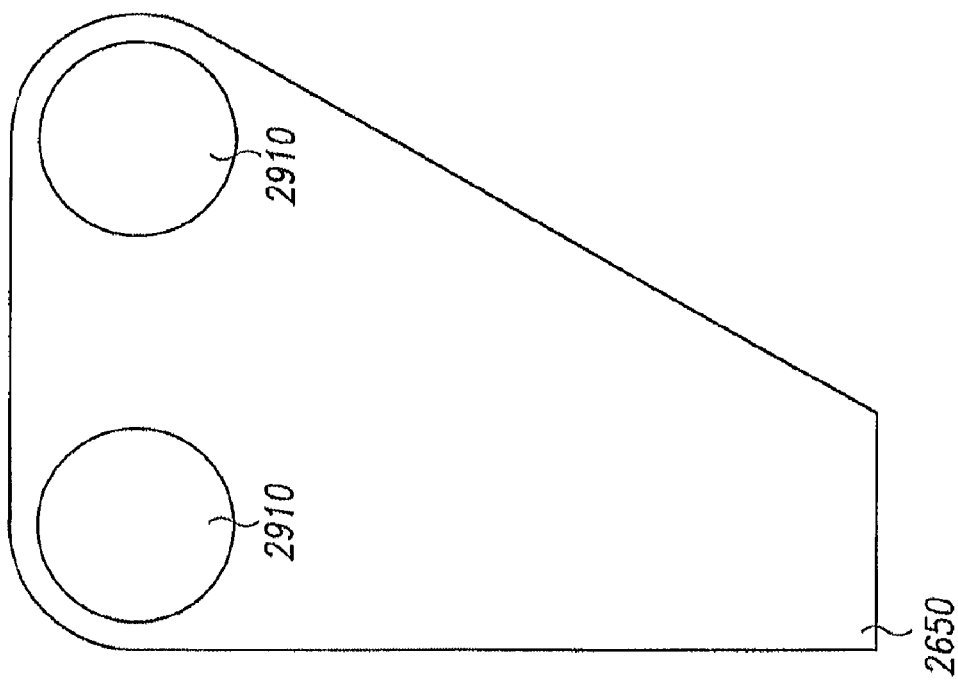
Figure 30:
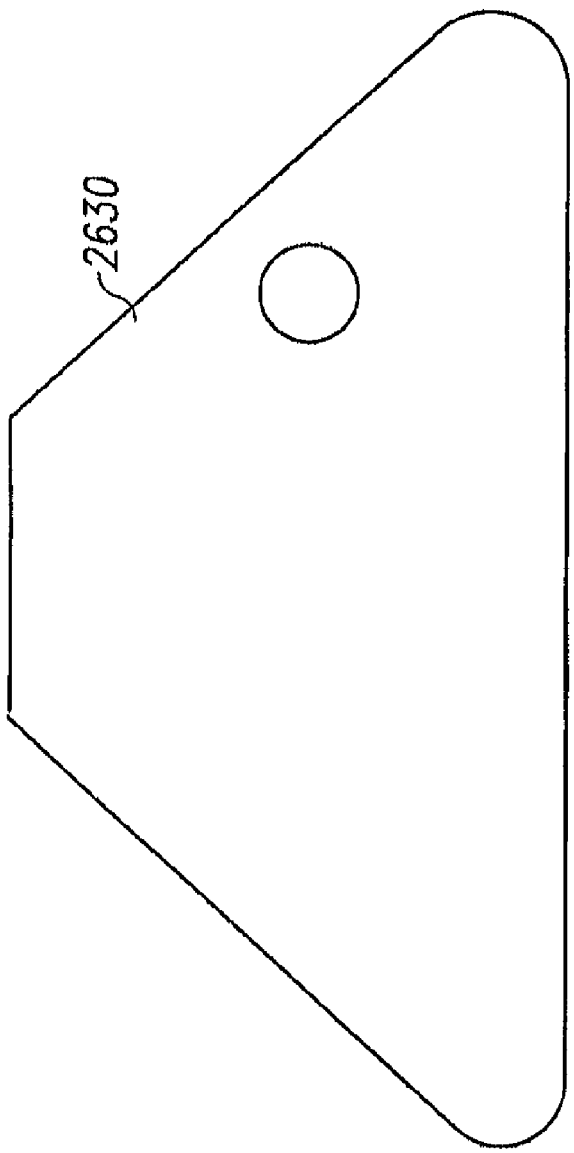

In one embodiment, frame member to trailer coupling plates 2640 are configured as shown in FIG. 28 and are formed from ⅜" steel plate and are formed to include a pivot pin-receiving hole 2810 sized to receive the shaft of a frame member pivot pin 2660 and a lock pin-receiving hole 2820 sized to receive the shaft of a frame member locking pin 2670. In one embodiment, trailer to frame member coupling plates 2650 are configured as shown in FIG. 29 and are formed from ¾" steel plate and are formed to include a pivot pin-receiving hole 2910 sized to receive the shaft of a frame member pivot pin 2460 and a lock pin-receiving hole 2920 sized to receive the shaft of a frame member locking pin 2470.

The shaft of a frame member pivot pin 2660 is received in the pivot pin-receiving holes 2910 and in pivot pin-receiving hole 2810. If the frame member pivot pins are the only pins received in the hitch assembly 28, the frame members 2610 and 2620 are free to pivot about their respective pivot pins 2660 so that the frame members 2610, 2620 can be pivoted to a location where they will not interfere with a delivery truck dumping material into the material receiving mechanism.

Figure 26:
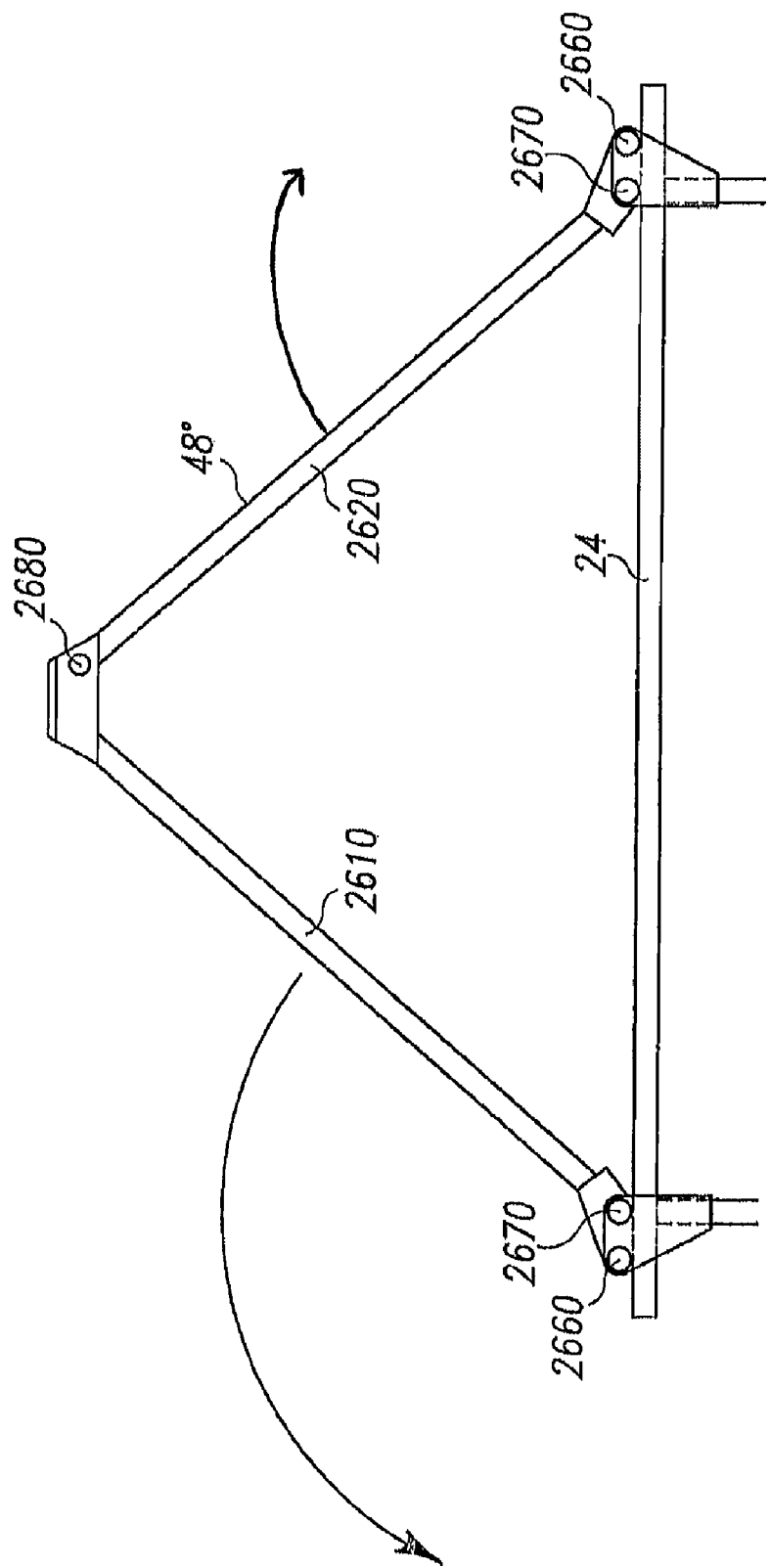
FIGS. 26-30 show the tow hitch assembly and various components thereof.
Figure 27:
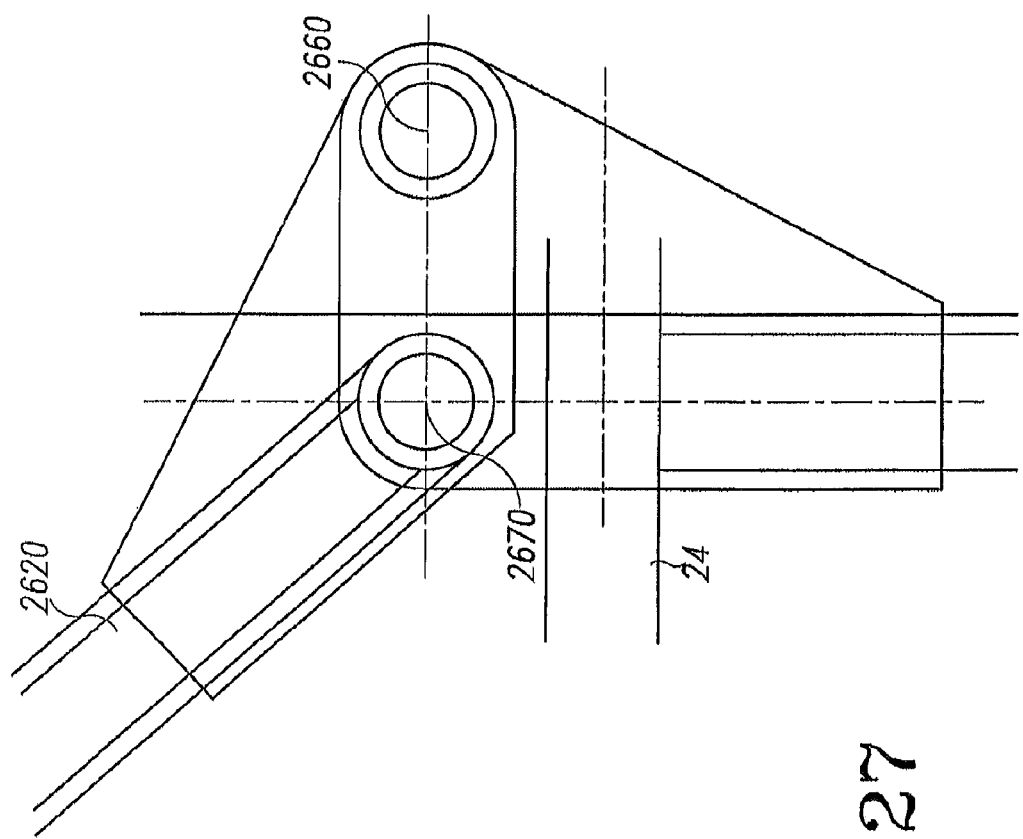

During towing or preparation therefore, the frame members are pivoted back to the position shown in FIG. 26 (during which the opposite end of the frame member 2620 pivots between the upper and lower frame member joining plates 2630 welded to frame member 2610). The shafts of the frame member to trailer locking pins 2670 are received in the lock pin-receiving holes 2820, 2920 to prevent the frame members from rotating about their respective pivot pins 2660. Additionally, the shaft of frame member to frame member locking pin 2680 is received in the pin-receiving hole in the opposite end of frame member 2620 and in the pin-receiving holes 3010 of the upper and lower frame member joining plates 2630.

After the conveyor 10 has been transported to the job site or to a storage location, hydraulic cylinders 300, as shown for example in FIGS. 1-4, 6 coupled to the trailer frame 24 and to the bogie 302 may be extended to lower the wheels 304 of the bogie 302 into contact with the ground. In one embodiment the wheels 304 are mounted to the bogie 302 with casters to allow the conveyor to be more maneuverable. Lowering the bogie 302 allows the conveyor to be more easily disconnected from the transport vehicle 8 and allows the conveyor 10 to be free standing. Alternatively, the conveyor can be coupled to the spreader/slinger to be pulled along thereby (as shown, for example, in the configuration illustrated in FIGS. 7 and 31) or to be pushed along thereby, (as shown, for example, in the configuration illustrated in FIGS. 6, 32, 33) to form a reload conveyor/spreader combination. As mentioned previously, while the conveyor is a component of the conveyor/spreader combination, pins may be removed from the tow hitch assembly to allow the frame members of the hitch to be pivoted to positions wherein they do not interfere with delivery vehicles discharging their loads of material into the hopper 94.

Figure 31:
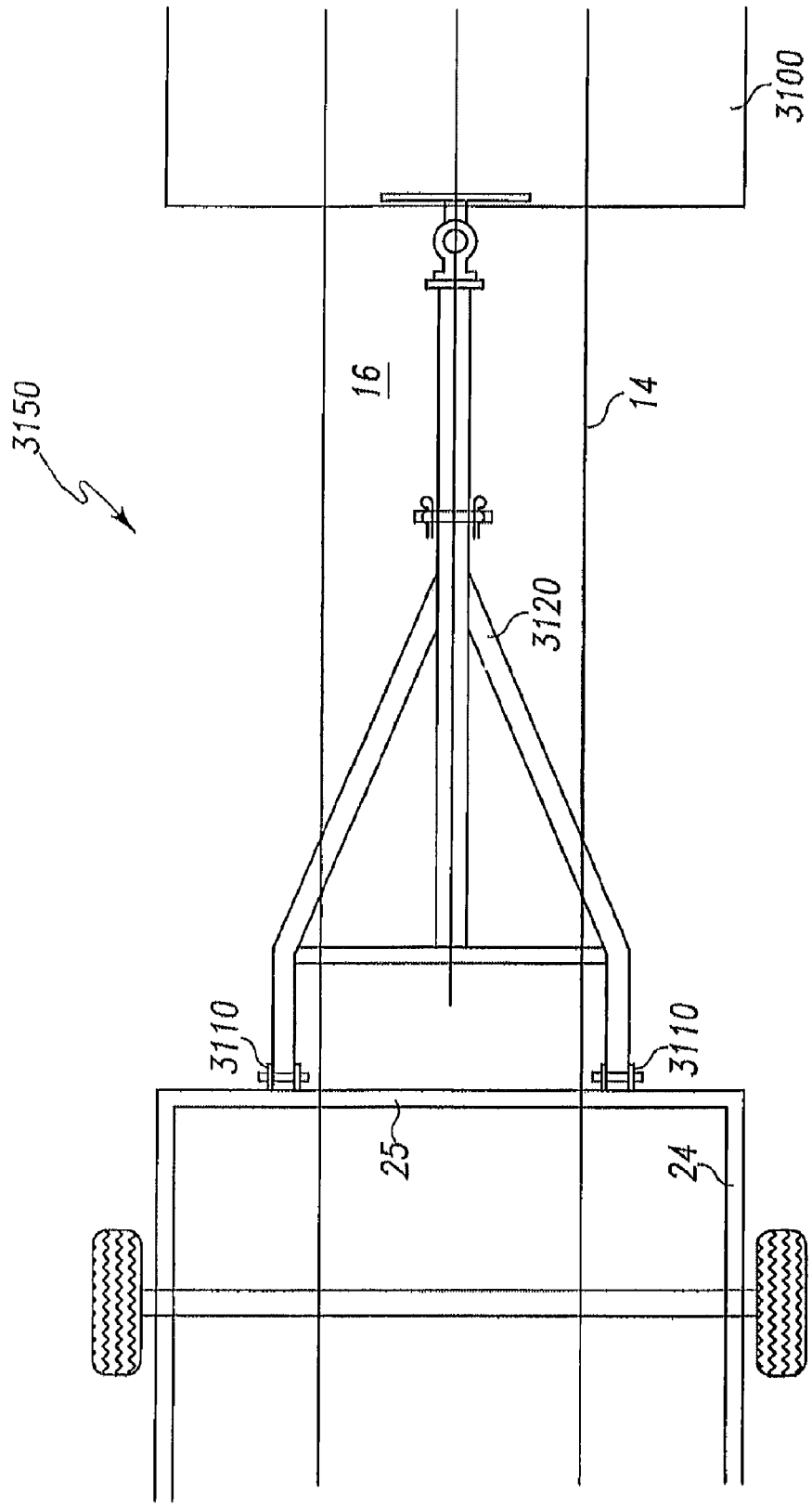
FIG. 31 is a side view of the reload conveyor with articulating conveyor frame showing the conveyor in a transfer configuration coupled to the rear of the slinger/spreader in the material transfer configuration.
Figure 32:
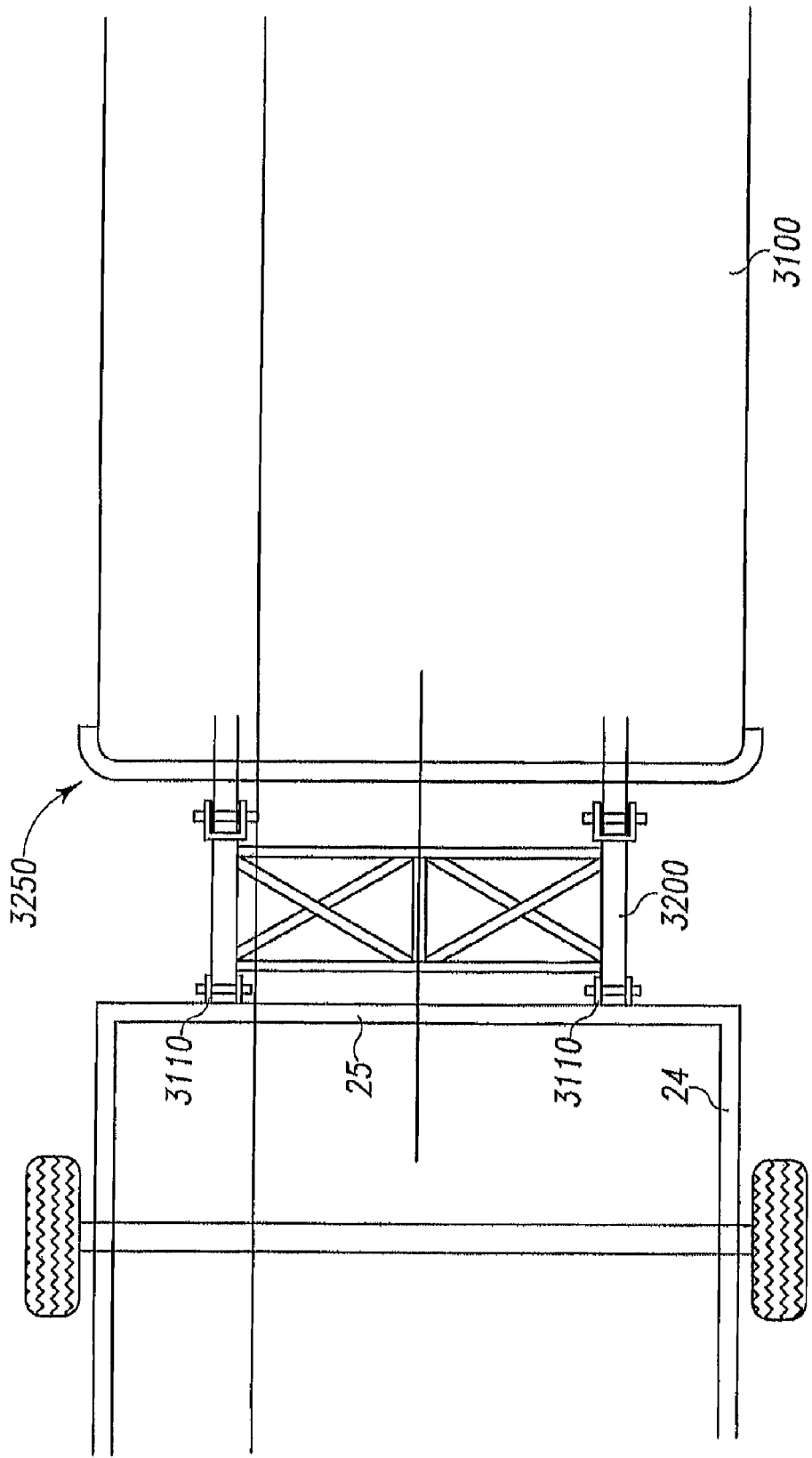
FIG. 32 is a simplified top view of the reload conveyor with articulating conveyor frame showing the conveyor in a transfer configuration the conveyor to the front of a slinger/spreader.
Figure 33:
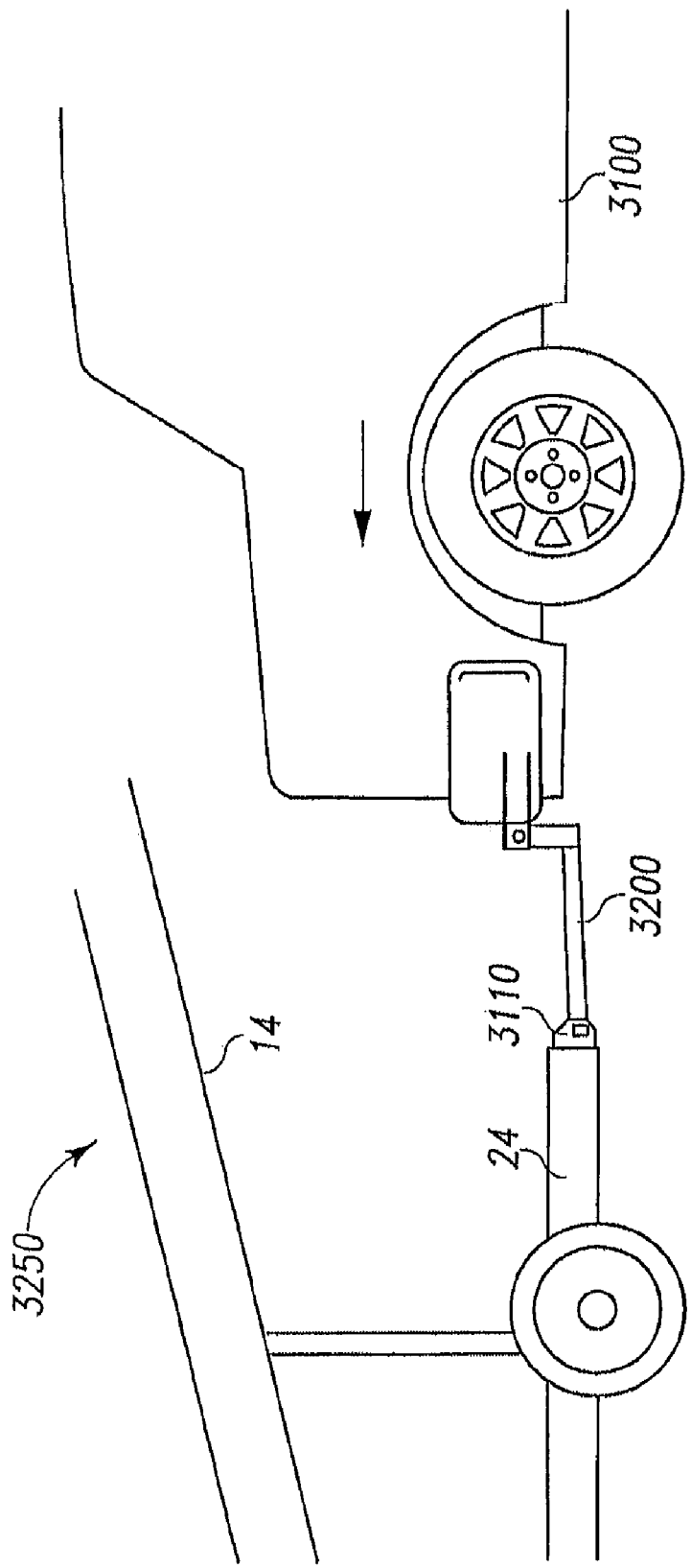
FIG. 33 is a simplified side view of the reload conveyor with articulating conveyor frame showing the conveyor in a transfer configuration coupled to the front of the slinger/spreader in the material transfer configuration.

As shown, for example, in FIGS. 31-33, brackets 3110 may be attached to a rear end member 25 of the frame 24 of the trailer to facilitate coupling a pull frame 3120 (FIGS. 7, 31) or push frame 3200 (FIGS. 6, 32, 33) or any other coupling device configured for connecting the rear end of the conveyor to a spreader/slinger or other material-receiving vehicle which may be loaded with material utilizing the conveyor 10. While specific embodiments of push frames and pull frames are illustrated, it is within the scope of the disclosure for any other properly configured push frame or pull frame to be utilized to couple the conveyor 10 to the spreader/slinger.

When so attached to the vehicle 3100, the conveyor frame will be locked in one of the transfer configurations with the discharge end of the conveyor disposed over the material receiving component of the vehicle 3100 (e.g. a bed or a hopper on a spreader/slinger). In combination with a spreader/slinger, the conveyor 10 can be pulled along by the spreader/slinger as it moves around the job site. So long as their is room for more material in the hopper of the spreader/slinger, a delivery vehicle can back up to the load end of the conveyor 10 and discharge its load into the material-receiving mechanism 18 fro transfer by the conveyor belt 16 to the spreader/slinger.

FIG. 31 illustrates a reload conveyor/spreader pull combination 3150. FIGS. 32 and 33 illustrate a reload conveyor/spreader push combination 3250. One advantage to the a reload conveyor/spreader push combination 3250 is that during roadway work, a delivery vehicle traveling along the road in the same direction as the conveyor/spreader combination 3250 pull into the same lane, or onto the same been and back into position to discharge its load into the hopper of the conveyor 10.

Many safety features, including but not limited to hooks, pins, and or locks are depicted in the drawings but are not described in writing herein. Nevertheless, the depiction of such safety features should be considered as part of the written description as if a full description of the depicted items is included herein. The components and manner of operation of various systems and mechanisms has been described herein. To the extent that any system or mechanism described herein is depicted differently in the drawings utilized as figures herein, the depicted systems and mechanisms should be considered alternative embodiments to the systems and mechanisms described in the written description.

We claim:

1. A reload conveyor with an articulating conveyor frame, the reload conveyor comprising:
    a conveyor frame configured to articulate to assume a transport configuration and a material transfer configuration wherein the overall length of the reload conveyor in the transport configuration is substantially shorter than in the transfer configuration;
    and a material receiving mechanism configured and arranged to assume a transfer configuration and a transport configuration wherein the width of the material receiving mechanism is substantially less in the transport configuration than in the transfer configuration.

2. The reload conveyor of claim 1 and further comprising a trailer and wherein the conveyor frame is mounted adjacent a load end thereof to the trailer to pivot about a pivot axis.

3. The reload conveyor of claim 2 and further comprising a conveyer pivoting mechanism including an actuator the conveyor pivoting mechanisms being mounted to the conveyor frame and being configured to induce pivoting of the conveyor frame about the pivot axis when the actuator is actuated.

4. The reload conveyor of claim 3 and further comprising a conveyor belt guided by the conveyor frame and configured to transport material received thereof from a material receiving position to a discharge position.

5. A reload conveyor with an articulating conveyor frame comprising a conveyor frame and a material receiving mechanism, wherein the conveyor frame is configured to articulate to assume a transport configuration and a material transfer configuration, wherein the overall length of the reload conveyor in the transport configuration is substantially shorter than in the transfer configuration, and wherein the width of the material receiving mechanism is substantially less in the transport configuration than in the transfer configuration.

6. The reload conveyor of claim 5 further comprising a trailer to which one end of the conveyor frame is pivotally coupled.

7. The reload conveyor of claim 6 wherein the conveyor frame is mounted adjacent a load end thereof to the trailer to pivot about a pivot axis.

8. The reload conveyor of claim 7 and further comprising a conveyer pivoting mechanism including an actuator.

9. A reload conveyor with an articulating conveyor frame comprising a conveyor frame, a material receiving mechanism, and a conveyer frame articulation mechanism including an actuator and a lock configured to remove stresses from the actuator when the conveyor is in a transfer configuration, wherein the conveyor frame is configured to articulate to assume a transport configuration and a material transfer configuration.

10. The reload conveyor of claim 9 and further comprising a trailer to which one end of the conveyor frame is pivotally coupled.

11. The reload conveyor of claim 10 wherein the conveyor frame is mounted adjacent a load end thereof to the trailer to pivot about a pivot axis.

12. The reload conveyor of claim 11 and further comprising a conveyer pivoting mechanism including an actuator.

13. The reload conveyor of claim 12 wherein the material receiving mechanism is also configured and arranged to assume a transfer configuration and a transport configuration.

14. The reload conveyor of claim 13 wherein the width of the material receiving mechanism is substantially less in the transport configuration than in the transfer configuration.

15. A combination reload conveyer/spreader comprising:
    a reload conveyor having:
        a conveyor frame configured to articulate to assume a transport configuration and a material transfer configuration wherein the overall length of the reload conveyor in the transport configuration is substantially shorter than in the transfer configuration;
        and a material receiving mechanism configured and arranged to assume a transfer configuration and a transport configuration wherein the width of the material receiving mechanism is substantially less in the transport configuration than in the transfer configuration; and
    a trailer to which a load end of the conveyor frame is mounted to pivot about a pivot axis; and
    a self propelled spreader including a material receiving compartment and a mechanism for spreading material received in the material receiving compartment;
    wherein the conveyor is coupled to the spreader to be transported by the spreader while the conveyor is positioned to discharge material into a material receiving compartment of the spreader.

16. The combination reload conveyer/spreader of claim 15 wherein the spreader pulls the conveyor.

17. The combination reload conveyer/spreader of claim 15 wherein the spreader pushes the conveyor.

* * * * *